United States Patent
Choe et al.

(10) Patent No.: US 9,197,089 B2
(45) Date of Patent: Nov. 24, 2015

(54) RAPID BATTERY CHARGING METHOD AND SYSTEM

(71) Applicant: AUBURN UNIVERSITY, Auburn, AL (US)

(72) Inventors: Song-Yul Ben Choe, Auburn, AL (US); Xueyan Li, Auburn, AL (US); Meng Xiao, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 356 days.

(21) Appl. No.: 13/676,762

(22) Filed: Nov. 14, 2012

(65) Prior Publication Data

US 2013/0119921 A1  May 16, 2013

Related U.S. Application Data

(60) Provisional application No. 61/559,484, filed on Nov. 14, 2011.

(51) Int. Cl.
| | |
|---|---|
| *H02J 7/00* | (2006.01) |
| *H01M 10/44* | (2006.01) |
| *H01M 10/48* | (2006.01) |
| *H01M 10/0525* | (2010.01) |

(52) U.S. Cl.
CPC .............. *H02J 7/007* (2013.01); *H01M 10/44* (2013.01); *H01M 10/443* (2013.01); *H01M 10/48* (2013.01); *H01M 10/0525* (2013.01); *H01M 10/486* (2013.01); *H02J 7/0075* (2013.01); *Y02T 10/7011* (2013.01)

(58) Field of Classification Search
CPC ...... Y02E 60/12; H02J 7/0004; H02J 7/0006; H01M 10/48; H01M 10/4257
USPC ........................................................ 320/106
See application file for complete search history.

(56) References Cited

U.S. PATENT DOCUMENTS

| | | | | |
|---|---|---|---|---|
| 6,441,586 | B1 * | 8/2002 | Tate et al. ...................... | 320/132 |
| 8,427,112 | B2 * | 4/2013 | Ghantous et al. ............. | 320/139 |

(Continued)

OTHER PUBLICATIONS

Arora et al., "Mathematical Modeling of the Lithium Deposition Overcharge Reaction in Lithium-Ion Batteries Using Carbon-Based Negative Electrodes ", J. Electrochem. Soc., vol. 146(10), pp. 3543-3553, 1999.

(Continued)

*Primary Examiner* — Arun Williams
(74) *Attorney, Agent, or Firm* — Gardner Groff Greenwald & Villanueva, PC

(57) ABSTRACT

A method of rapidly charging a battery includes: (a) applying a charge to the battery using a charging profile; (b) monitoring a terminal voltage of the battery; (c) using a mathematical model to estimate a desired temporal state of charge of the battery and to estimate a predicted terminal voltage; (d) using the monitored terminal voltage of the battery and the predicted terminal voltage to determine an error; (e) applying the error to calculate a calculated state of charge of the battery; and (f) controlling the charge applied by the charging profile to urge the calculated state of charge of the battery toward the desired temporal state of charge of the battery. For use with lithium ion batteries, such feedback is used to limit ion concentration levels. Preferably, a Reduced Order Model is used to minimize computational requirements and facilitate real-time calculations.

28 Claims, 23 Drawing Sheets

(56) References Cited

U.S. PATENT DOCUMENTS

2008/0238357 A1* 10/2008 Bourilkov et al. ............ 320/106
2009/0276172 A1* 11/2009 Nishi .............................. 702/63

OTHER PUBLICATIONS

Chaturvedi et al., "Modeling, Estimation, and Control Challenges for Lithium-Ion Batteries," 2010 American Control Conference, pp. 1997-2002, 2010.

Chen, Liang-Rui, "A Design of an Optimal Pulse Charge System by Frequency-Varied Technique", IEEE Trans. Ind. Electron., vol. 54, pp. 398-405, 2007.

Guo et al., "Single-Particle Model for a Lithium-Ion Cell: Thermal Behavior," J. Electrochem. Soc., 158(2), pp. A122-A132, 2011.

He et al., "State-of-Charge Estimation of the Lithium-Ion Battery Using an Adaptive Extended Kalman Filter Based on an Improved Thevenin Model," IEEE Transactions on Vehicular Technology, vol. 60(4), pp. 1461-1469, 2011.

Kim, Il-Song, "Nonlinear State of Charge Estimator for Hybrid Electric Vehicle Battery," IEEE Transactions on Power Electronics, vol. 23(4), pp. 2027-2034, 2008.

Klein et al., "Optimal Charging Strategies in Lithium-Ion Battery," 2011 American Control Conference, pp. 382-387, 2011.

Li et al., "Reduced Order of Electrochemical Model for a Pouch Type High Power Li-Polymer Battery," International Conference on Clean Electrical Power, pp. 593-599, 2011.

Li et al., "State-of-Charge (SOC) Estimation Based on Reduced Order of Electrochemical Model for a Pouch Type High Power Li-Polymer Battery," IEEE Vehicle Power and Propulsion Conference, 2011.

Luo et al., "Search for an Optimal Multistage Charging Pattern for Lithium-Ion Batteries Using the Taguchi Approach," TENCON 2009—2009 IEEE Region 10 Conference, pp. 1-5, 2009.

Pals et al., "Thermal Modeling of the Lithium/Polymer Battery," J. Electrochem. Soc., 142(10), pp. 3274-3281, 1995.

Piller et al., "Methods for State-of-Charge Determination and Their Applications," J. of Power Sources, vol. 96, pp. 113-120, 2001.

Plett, Gregory L., "Extended Kalman Filtering for Battery Management Systems of LiPB-Based HEV Battery Packs." J. Power Sources, vol. 134, pp. 252-292, 2004.

Pop et al., "Battery Aging and Its Influence on the Electromotive Force," J. Electrochem. Soc., vol. 154(8), pp. A774-A750, 2007.

Rahimian et al., "Maximizing the Life of a Lithium-Ion Cell by Optimization of Charging Rates," J. Electrochem. Soc., 157(12), pp. A1302-A1308, 2010.

Ramadesigan et al., "Efficient Reformulation of Solid-Phase Diffusion in Physics-Based Lithium-ion Battery Models," J. Electrochem. Soc., 157, pp. A854-A860, 2010.

Salkind et al., "Determination of State-of-Charge and State-of-Health of Batteries by Fuzzy Logic Methodology," J. Power Sources, vol. 80, pp. 293-300, 1999.

Santhanagopalan et al., "Online Estimation of the State of Charge of a Lithium Ion Cell," J. Power Sources, vol. 161(2), pp. 1346-1355, 2006.

Smith et al. "Control oriented 1D electrochemical model of lithium ion battery," Energy Conversion and Management, vol. 48, pp. 2565-2578, 2007.

Tang et al., "Two-Dimensional Modeling of Lithium Deposition During Cell Charging," J. Electrochem. Soc. 156, pp. A390-A399 (2009).

Xiao et al., "Static and Dynamic Analysis of Li-Polymer Battery Using Thermal Electrochemical Model," 2010 IEEE Conference on Innovative Technologies for an Efficient and Reliable Electricity Supply (CITRES), pp. 309-316, 2010.

* cited by examiner

RAPID BATTERY CHARGING METHOD AND SYSTEM

CROSS-REFERENCE TO RELATED APPLICATION

This application claims the priority benefit of 61/559,484 filed on Nov. 14, 2011, which is hereby incorporated herein by reference.

TECHNICAL FIELD

The present invention relates generally to rechargeable batteries and, in particular, to a method and system for rapidly recharging batteries, including Lithium ion batteries.

BACKGROUND

Batteries are widely used as rechargeable energy storage devices for a tremendous variety of different applications because of a battery's relative high energy and power density and relatively low cost in comparison to other storage technologies. Some such batteries are designed to be recharged. Among the available rechargeable battery technologies, the Lithium ion battery is very widely used and accepted due to its very high power and energy density. Lithium ion batteries find applications in portable electronics, hybrid and electric vehicles, renewable power systems and others. Such a battery is frequently discharged and re-charged.

The maximum charge level and the maximum charging rate for a lithium ion battery is often predefined by the battery manufacturer and accordingly the amplitude and duration of the charge being supplied to the battery (to recharge the battery) should be controlled. Generally, an electric charger is used for supplying a constant current and a constant voltage to reach a full charge that manufacturers specify. This known charging method uses a fixed charging profile in which a constant current is applied until a certain voltage is reached in the battery and then a constant voltage is applied to reach the full capacity. This is referred to as Constant Current/Constant Voltage charging ("CC/CV" charging). While this standard CC/CV charging profile is simple to implement in a battery management system, the known methods have not been completely optimized with respect to better performance, such as larger capacity storage, larger energy storage, shorter charging times, less cell degradation, better safety and so on.

There have been several approaches in the past to attempt to optimize the charging profiles. With "optimized" charging methods, charging speed has been improved. However, cell degradation caused by fast charging has not been taken into account in these known prior techniques. One of the significant issues is Lithium deposition, which occurs at the negative electrode during a fast charge, or at low temperatures (especially at the end of charging). During a rapid charge, lithium ions are transported from the cathode to the anode, which causes a high ion concentration at the anode surface because it takes a while for lithium ions to diffuse in the lattice structure and intercalate with the carbon atom structure. Lithium metal forms first near the electrode-separator boundary, where surface concentration of ions is at the highest during charging. When the lithium ions cannot insert themselves into a saturated negative electrode and they plate out of the electrolyte onto the surface, this leads to capacity losses of active lithium and of the electrolyte. This also compromises cell safety by creating the possibility for dendritic electrode growth that leads to an internal shorting-circuiting.

A major issue for a Lithium battery is a capacity fade during cycling, which is intensified by charging at high current. The reaction on the negative electrode is described as

Primary side reaction taking place in anode is as follows, where the lithium ions react with electrons and form a lithium solid;

Particularly, the side reaction described above increases as the current density becomes high and the cell is overcharged. A high current leads to a high lithium surface concentration between electrolytes and the negative electrode and causes excessive ions at the surface. These excessive ions cause side reactions and form lithium plating that eventually leads to aging and failures, particularly on the anode side. Therefore, the battery manufacturers specify a maximum charging current.

Accordingly, it can be seen that a need remains for a system and method for recharging batteries that allows the batteries to be rapidly recharged while minimizing deleterious effects, including a system and method for charging lithium ion batteries. It is to the provision of such that the present invention is primarily directed.

SUMMARY OF THE INVENTION

Generally described, the present invention relates to a method of rapidly charging a battery and includes applying a charge to the battery using a charging profile; monitoring a terminal voltage of the battery; (c) using a mathematical model to estimate a desired temporal state of charge of the battery and to estimate a predicted terminal voltage; (d) using the monitored terminal voltage of the battery and the predicted terminal voltage to determine an error; (e) applying the error to calculate a calculated state of charge of the battery; and (f) controlling the charge applied by the charging profile to urge the calculated state of charge of the battery toward the desired temporal state of charge of the battery. For use with lithium ion batteries, such feedback is used to control ion concentration levels during the recharging. Preferably, a Reduced Order Model ("ROM") is used to minimize computational requirements and facilitate real-time calculations.

In one preferred form the present invention relates to a system and method for rapidly charging a lithium ion battery while avoiding harm to the battery. A method of charging a lithium ion battery according to this embodiment includes:
(a) applying a charge to the battery using a charging profile;
(b) monitoring a terminal voltage of the battery while applying the charge using the charging profile;
(c) using a mathematical model to estimate a desired lithium ion concentration at an electrode of the battery and to estimate a predicted terminal voltage;
(d) using the monitored terminal voltage of the battery and the estimated terminal voltage to determine an error between the two;
(e) applying the error to the desired lithium ion concentration to calculate a calculated lithium ion concentration; and
(f) modifying the charge applied by the charging profile to urge the calculated lithium ion concentration toward the desired lithium ion concentration, whereby rapid charging of the battery can be obtained while avoiding or minimizing deleterious effects from excessive lithium ion concentrations.

Defined another way, the present invention can be implemented as a method or system for charging a rechargeable battery using a charging profile and in which an internal characteristic, which is difficult or impractical to measure directly, is instead estimated. Meanwhile, the terminal voltage of the battery is measured during charging and is compared with a predicted or modeled terminal voltage to allow the charging profile to be adjusted one way or another (charging increased, decreased, or resting) in order to urge the estimated internal characteristic toward a desired level. Optionally, this is used to allow the ion concentration of a lithium ion battery, which is difficult or impractical to measure directly, to be controlled during the charging of the battery so as to avoid reaching undesirably high concentrations of ions during the recharging, thereby enabling rapid charging thereof without causing the battery capacity to fade.

In another preferred form, the present invention relates to a method of charging a battery having pair of terminals, the method comprising the steps of:
  (a) applying a charge to the battery using a charging profile;
  (b) monitoring a terminal voltage of the battery while applying the charge using the charging profile;
  (c) using a mathematical model to estimate a desired temporal state of charge of the battery and to estimate a predicted terminal voltage; and
  (d) using the monitored terminal voltage of the battery and the predicted terminal voltage to determine an error between the two;
  (e) applying the error to the desired temporal state of charge of the battery to calculate a calculated state of charge of the battery; and
  (f) modifying the charge applied by the charging profile to urge the calculated state of charge of the battery toward the desired temporal state of charge of the battery, whereby rapid charging of the battery can be obtained while avoiding or minimizing deleterious effects on the battery from excessively high temporal charging rates.

Optionally, the mathematical model comprises a reduced order model. Also optionally, the charging profile can be a pulsed charging current. Moreover, the charging profile can use a combination of positive, negative and zero charge currents.

The lithium ion concentration can be estimated as a function of measured current, measured terminal voltage, and/or temperature. Moreover, the mathematical model can be used to produce as outputs (1) estimated surface ion concentration, (2) estimated SOC, and (3) estimated terminal voltage, etc.

Preferably, the estimated SOC or the estimated terminal voltage is compared with a measured SOC or a measured terminal voltage to determine a relative error between the mathematical model and the actual charging performance, and the relative error is used to modify the applied voltage and/or the applied current.

Optionally, the applied voltage or the applied current can be applied in a two-level cycling charging profile using charging cycles and discharging cycles or in a three-level cycling charging profile using charging pulses, rest pulses, and discharging pulses.

These and other aspects of the present invention will become more apparent upon considering the following detailed description of the invention.

DETAILED DESCRIPTION OF EXAMPLE EMBODIMENTS

Figure 1:
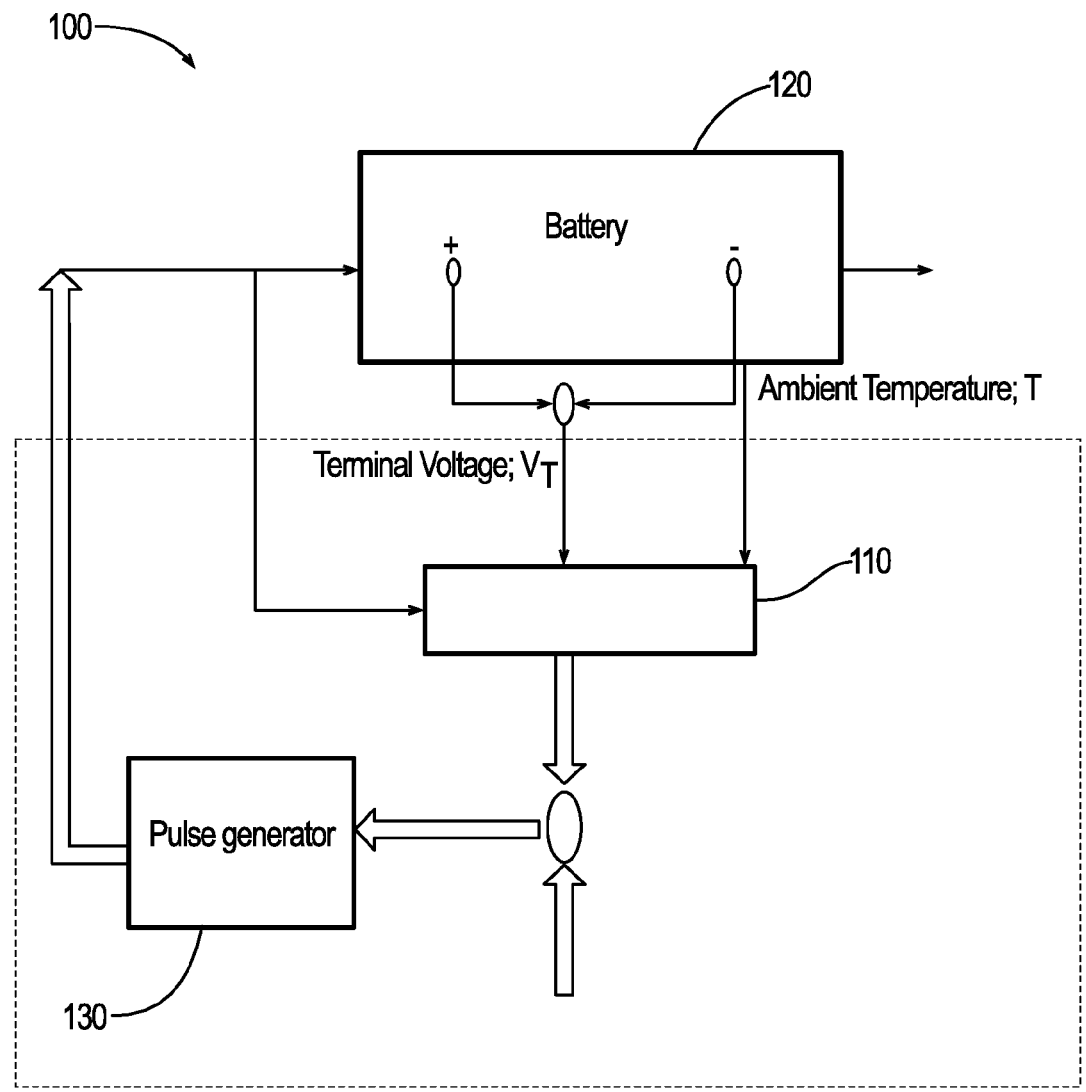
FIG. 1 is a schematic illustration of a battery charging controller and method according to a first example embodiment of the present invention.
Figure 2:
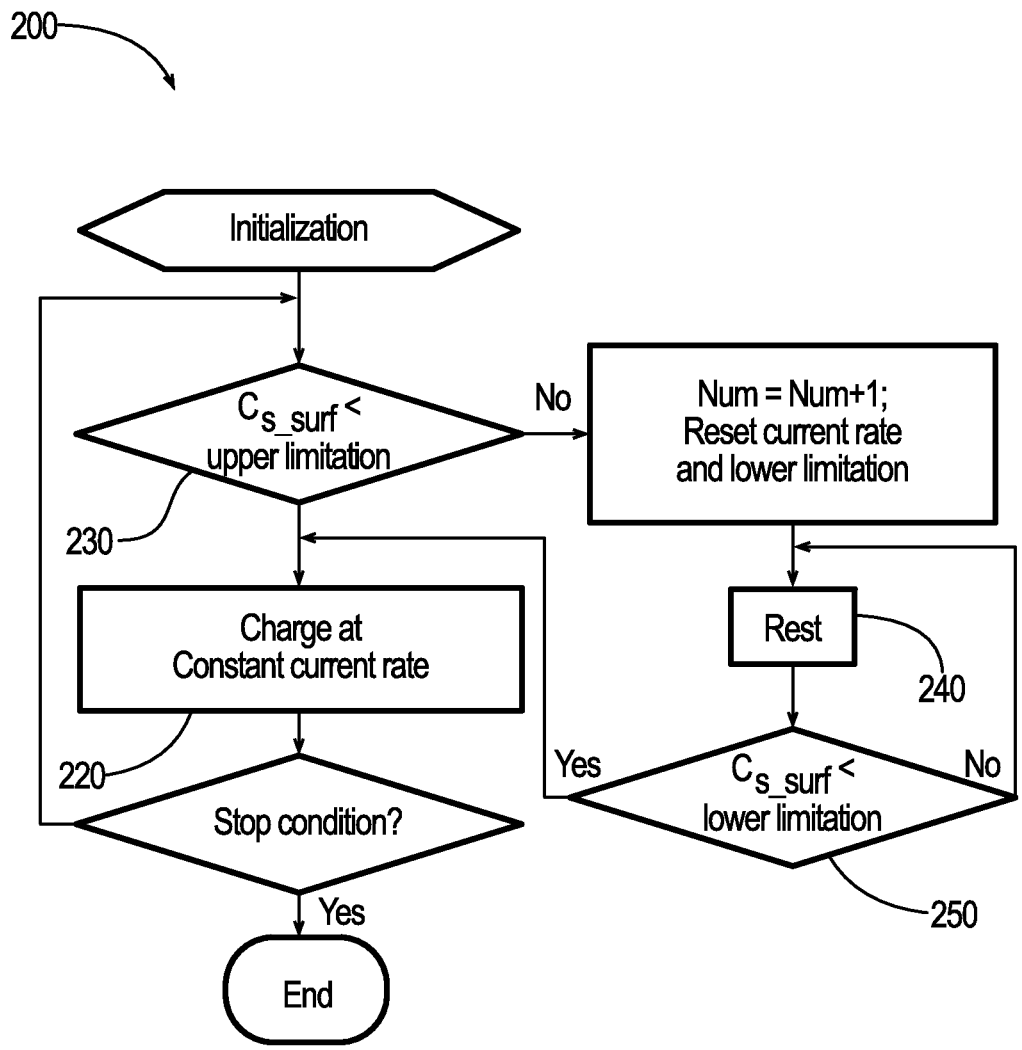
FIG. 2 is a schematic illustration of a battery charging controller and method according to a second example embodiment of the present invention.
Figure 3:
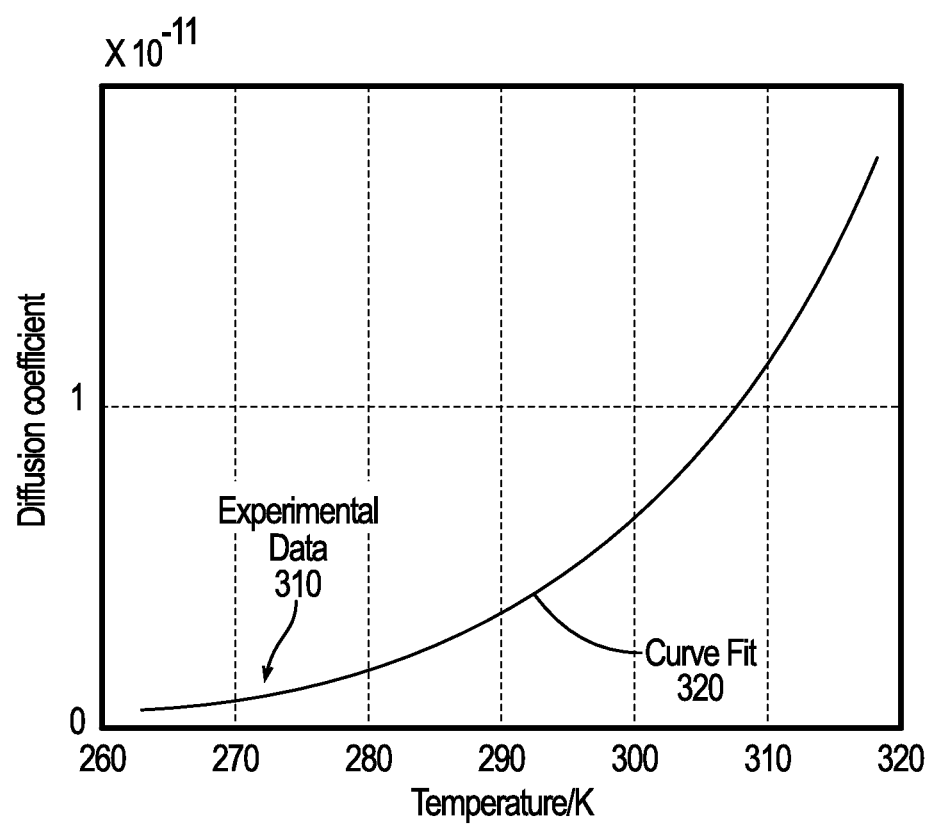
FIG. 3 is a schematic illustration (chart) of a curve fitting of temperature effects on battery characteristics, which can be taken into account in the present invention.
Figure 4:
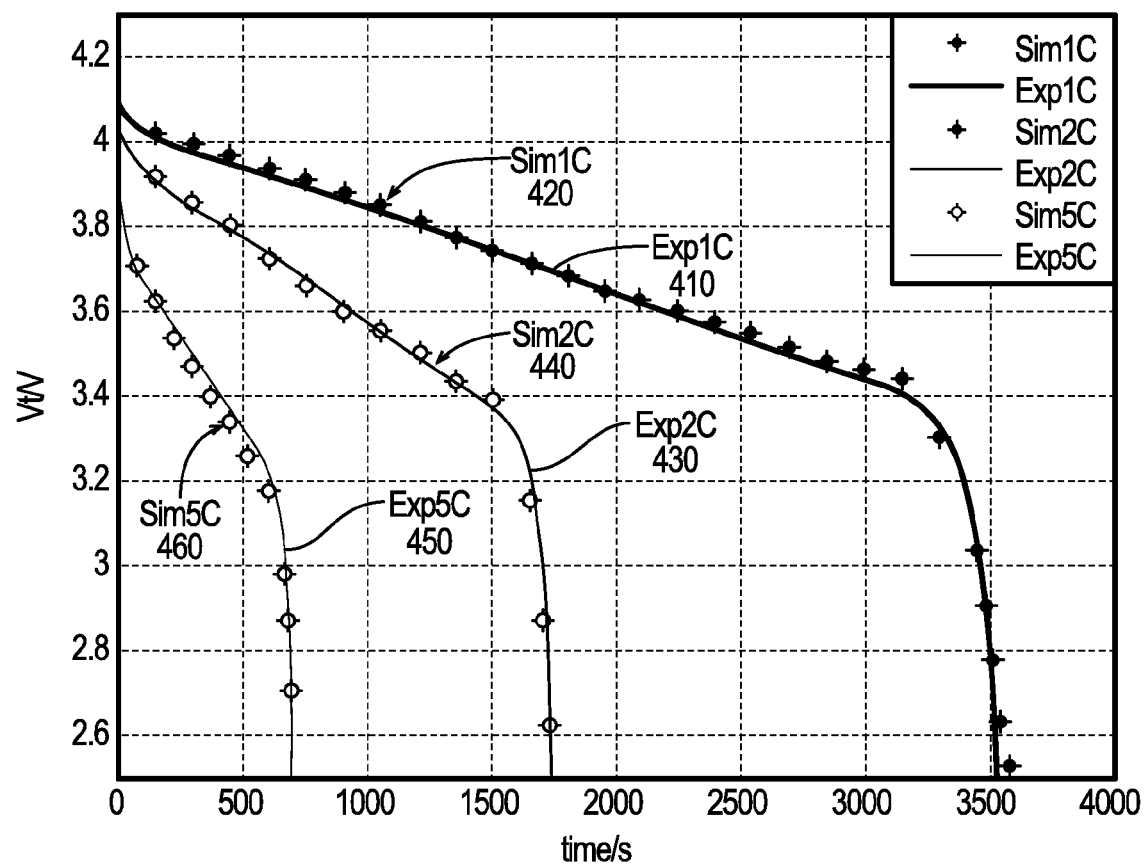
FIG. 4 is a schematic illustration (chart) of simulations of battery terminal voltages over time at different discharge rates, compared with experimentally measured terminal voltages.
Figure 5:
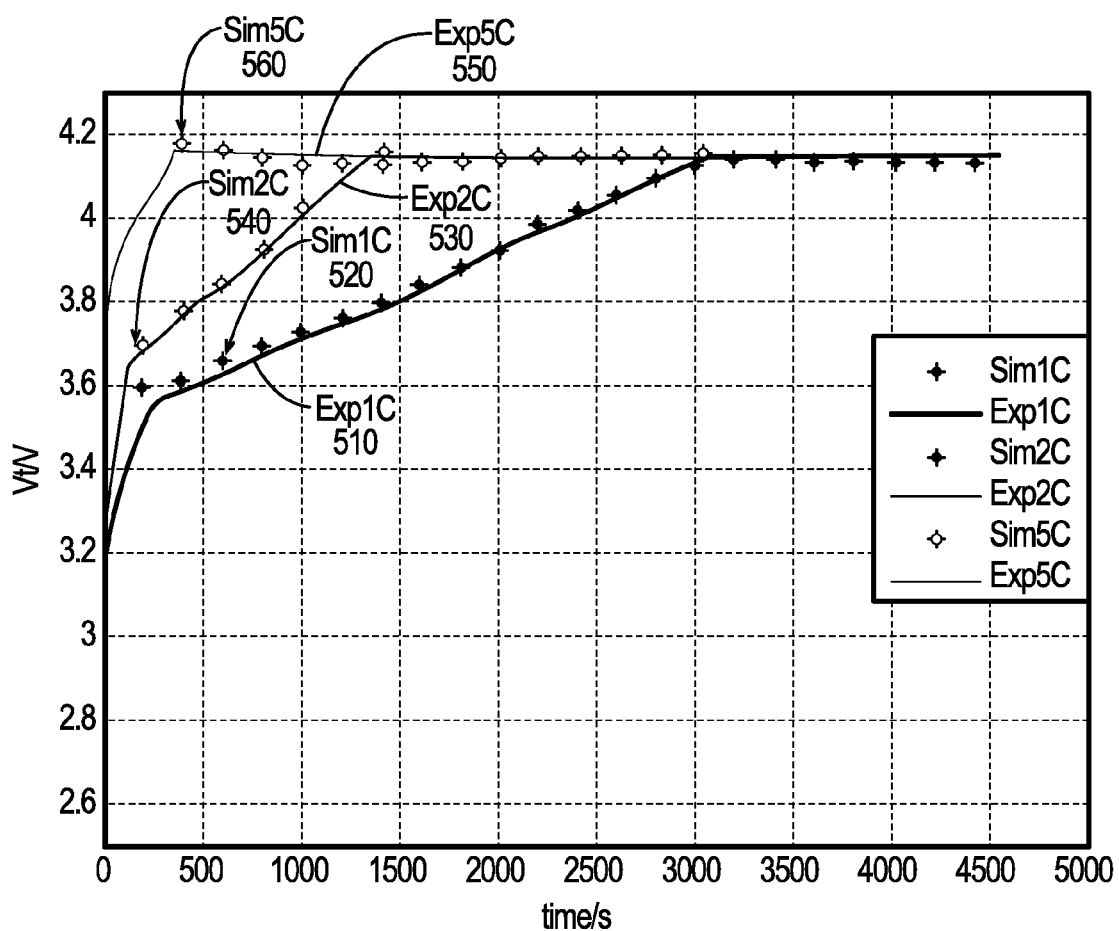
FIG. 5 is a schematic illustration (chart) of simulations of battery terminal voltages over time at different charge rates, compared with experimentally measured terminal voltages.
Figure 6:
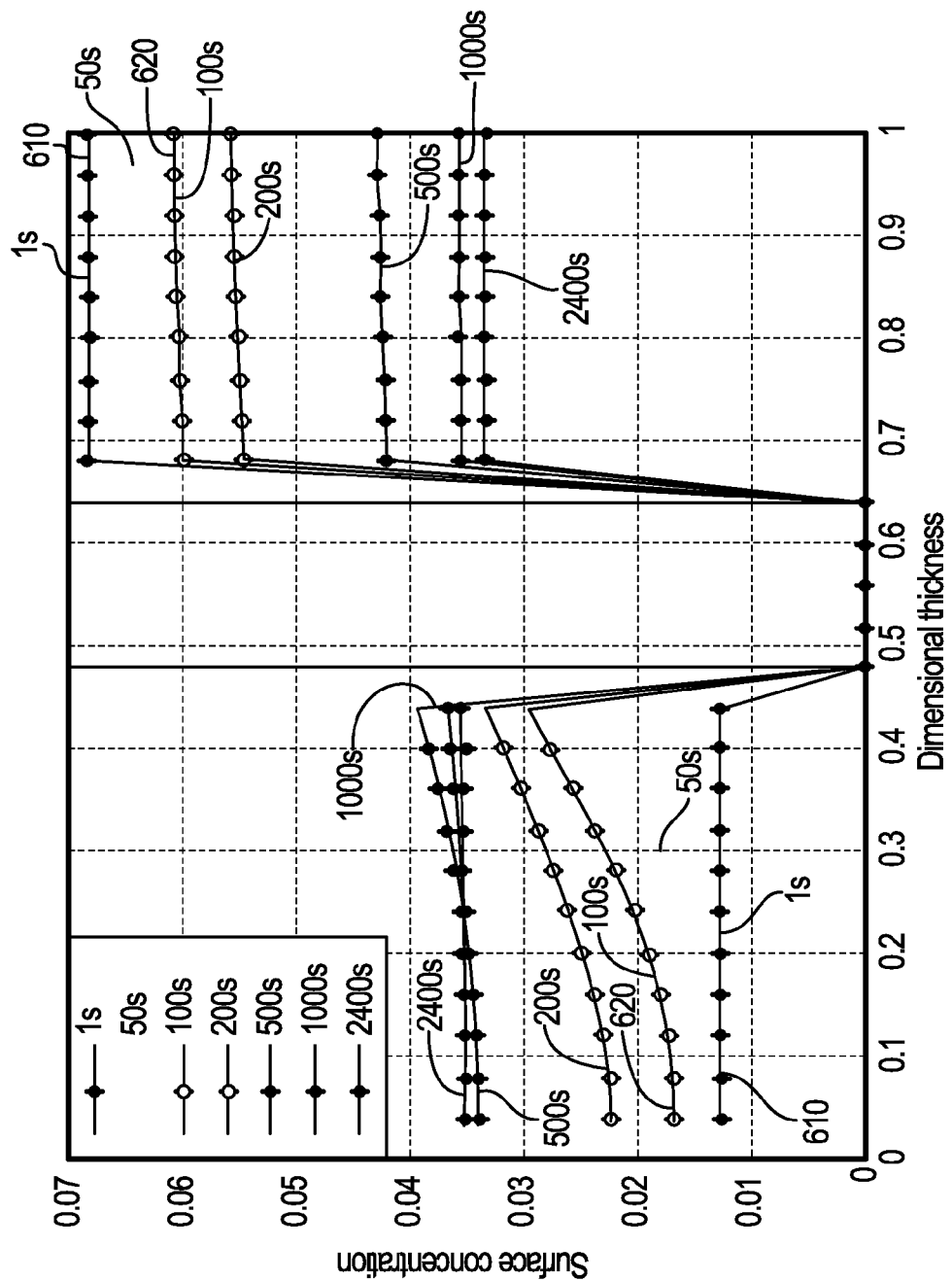
FIG. 6 is a schematic illustration (chart) of estimations of ion surface concentrations over time at different charge rates.

Generally described, the present invention relates to a method and system for charging a battery with a charging profile that reduces the charging time and prolongs battery life/strength. Such a method and system does so by estimating conditions within the battery during the recharging, correlating the estimation by adjusting it according to one or more actual measurements of the battery's condition, adjusting the estimation by taking the actual measurement(s) into account, and adjusting the charging profile with a feedback loop using this information. In the context of a lithium ion battery (an important application for this invention), this is done by keeping the ion concentrations within the battery from reaching undesirable levels. Thus, saturation concentrations are avoided and this prevents the battery from producing the lithium-plating and other side effects caused by an excessive ion concentration.

The excessive ion concentrations could be prevented if the surface ion concentrations could be measured and used to limit the charging current. Currently, there is no in-situ measurement technique that allows for direct measurements of concentrations in the battery being recharged. Therefore, the solution for a lithium ion battery according to the present invention is to construct a mathematical model that provides estimations of internal battery variables in real time and to imbed that mathematical model in a battery charger controller.

The present inventors have developed a computational model based on electrochemical and thermal principles. The model is fully capable of representing two dimensional transient and non-isothermal behavior of a single cell, which is called a full order model (FOM). Electrochemical kinetics, mass and charge balances, ohmic equations and energy equations used for the model are partial differential equations (PDE). Unfortunately, solving the equations numerically is very computationally intensive and at present the FOM cannot be effectively used for real world applications. Thus, the inventors have discovered that order of the FOM can be reduced further to obtain a reduced order model (ROM), which runs faster and allows for integration into the battery control hardware. The ROM is a physics-based model with a treatment of the PDE in a manner so as to reduce the computational time. At the same time, the model allows for estimation of State Of Charge (SOC) and concentrations and other internal variables.

Based on the ROM, a new fast charging method is developed, which controls the charging current based on State-of-Charge (SOC) and the lithium concentration at the surface of electrode. The anticipated effects of this method is either protecting the battery from aging, lithium plating, capacity losses caused by the high lithium concentration during fast charging process or reducing the charging time or some combination of the two. The charging profile produced is a form of pulse charging that consists of a combination of positive, zero and negative currents. Multiple simulations and experiments have shown that the charging time can be reduced to 30-40% of typical CC/CV charging methods.

Referring now to the drawing figures, in which like reference numbers represent like parts throughout the several views, FIG. 1 is a schematic illustration of a rapid battery charging controller and method (100) according to a first example embodiment of the present invention. In this example embodiment, active control of the charging current is carried out using two variables: the surface ion concentration and the SOC. Particularly, the surface ion concentration is practically immeasurable and thus is estimated using a mathematical model (110) that allows for estimating the concentrations based on measured current, terminal voltage and temperature. The inputs for the model (110) are the time varying charging or discharging current, terminal voltage and ambient temperature. The outputs of the model (110) are the surface concentration of negative electrode, SOC and terminal voltage. Due to some inaccuracy of the mathematical model, a feedback controller is employed to compensate for errors in the application of the mathematical model (110). The controller compares the measured terminal voltage of the battery (120) with the output of the estimated terminal voltage and corrects the ion concentrations of the mathematical model.

Once the reference values for the SOC and the ion concentration are set at a maximum allowable temperature, the charging profile can be determined based on the differences between the reference and the estimated variables from the ROM. Using the differences, two-level charging profile (charging and discharging) or three-level charging profile (charging, rest and discharging) pulses are generated using a so-called "bang-bang" control or a Pulse-Width-Modulator (PWM) (130) that compares the error with a triangle or saw tooth in order to create two or three states of pulse currents.

A flow chart (200) for determination of the pulse current is shown in Error! Reference source not found. Generally, the surface ion concentration at the negative electrode increases during charging and decreases during resting or discharging. In effect, the ions are "pushed" toward the negative electrode (the anode) during charging, are "pushed" away from the negative electrode during discharging, and tend to relax during resting. The charging strategy (profile) consists of two parts: in the beginning, the cell is charged with a constant current rate (220) until the surface concentration reaches an upper limit (230), which is established based on physical characteristics of the battery's cell. In the second part, the cell can be rested (240) or discharged until the surface concentration reaches a lower limit (250), then constant current rate charging (220) starts until the surface concentration reaches an upper limit.

Mathematical models for a battery charger can be broadly categorized in three different types: as using empirical equations, as using electrochemical/thermal principles, or as using electric equivalent circuit components. The electric circuit model (ECM) is based on open circuit voltage. Model errors of the ECM are reduced by applying advanced feedback controls, such as a Kalman filter, linear observer, sliding-mode observer, fuzzy logic, artificial neural network, and other techniques. These methods allow for an estimation of SOC and terminal voltage based on ECM, which, however, does not consider temperature effects.

In stark contrast, the full order electrochemical model used for the present estimation includes the thermal effects. However, the FOM has a major disadvantage of high computational time requirements that prevent from application of the model in a real time (it takes too long to make the calculation in real time). Therefore, the order of FOM is reduced to a reduced order model (ROM). There have been several authors who include effects of the temperature on the performance. But the heat generation caused by ion concentrations gradients has not been considered previously. This is a significant factor for good estimation of accurate heat generation rate, especially during rest periods.

An example reduced order model developed by the present inventors consists of four sub-models or modules: 1) Ion concentration in/at the electrodes; 2) Ion concentration in the electrolyte, 3) Potentials in both electrolyte and electrodes, and 4) Temperature in the cell.

The ion concentration in/at the solid electrodes is replaced with a polynomial under the assumption that ion concentrations inside the spherical particles are a function of the radius of the sphere as suggested by V. Subramanian et al, and as shown in Equation (3), $$c_s(r, t) = a(t) + b(t) \cdot \left(\frac{r^2}{R_s^2}\right) + d(t) \cdot \left(\frac{r^4}{R_s^4}\right) \quad (3)$$

where the coefficients, $a(t)$, $b(t)$, and $d(t)$ are each a function of time.

The equation is solved for the coefficients using three variables: volume-averaged concentrations ($c_{s,ave}$); volume-averaged concentration fluxes ($q_{ave}$); and surface concentrations ($c_{s,surf}$), given by $$a(t) = \frac{39}{4} c_{s,surf} - 3 q_{ave} R_s - \frac{35}{4} c_{s,ave} \quad (4)$$

$$b(t) = -35 c_{s,surf} + 10 q_{ave} R_s + 35 c_{s,ave}$$

$$c(t) = \frac{105}{4} c_{s,surf} - 7 q_{ave} R_s - \frac{105}{4} c_{s,ave}$$

where the volume-averaged concentration, volume-averaged concentration flux, and surface concentration are defined as;

$$c_{s,ave} = \int_0^{R_s} \frac{3r^2}{R_s^3} c_s(r, t) \, dr \quad (5)$$

$$q_{ave} = \int_0^{R_s} \frac{3r^2}{R_s^3} \left(\frac{\partial}{\partial r} c_s(r, t)\right) dr$$

$$c_{s,surf}(r, t) = a(t) + b(t) \cdot \left(\frac{r^2}{R_s^2}\right) + d(t) \cdot \left(\frac{r^4}{R_s^4}\right)$$

By combination with Fick's law and the boundary conditions, the three above equations become;

$$\frac{d}{dt} C_{s,ave} + 3 \frac{j^{Li}}{R_s a_s F} = 0 \quad (6)$$

$$\frac{d}{dt} q_{ave} + 30 \frac{D_s}{R_s^2} q_{ave} + \frac{45}{2} \frac{j^{Li}}{R_s^2 a_s F} = 0$$

$$35 \frac{D_s}{R_s} (C_{s,surf} - C_{s,ave}) - 8 D_s q_{ave} = -\frac{j^{Li}}{a_s F}.$$

Distribution of the ion concentrations in the electrolyte and its boundary conditions is described as $$\frac{\partial (\varepsilon_e c_e)}{\partial t} = \frac{\partial}{\partial x}\left(D_e^{eff} \frac{\partial}{\partial x} c_e\right) + \frac{1 - t_+^0}{F} j^{Li} \quad (7)$$

$$\left.\frac{\partial c_e}{\partial t}\right|_{x=0} = \left.\frac{\partial c_e}{\partial t}\right|_{x=L} = 0$$

where $C_e$ is the lithium-ion concentration in electrolyte phase, $\varepsilon_e$ is the porosity, $t_+^0$ is the transference number, $D_e^{eff}$ is the effective diffusion coefficient calculated using the equation $$D_e^{eff} = D_e \cdot \varepsilon_e^p \quad (8)$$

The phase potential difference, $\phi_{se}$, is defined as $$\phi_{se} = \phi_s - \phi_e \quad (9)$$

So, the ordinary differential equation (ODE) of the potential can be simplified as $$\frac{\partial}{\partial x}\left(\frac{\partial}{\partial x} \phi_{se}\right) = j^{Li}\left(\frac{1}{\sigma^{eff}} + \frac{1}{k^{eff}}\right) \quad (10)$$

Temperature in a battery can be simply described using the energy equation under isothermal condition, $$\rho C_p \frac{\partial T}{\partial t} = Q_{gen} - q \quad (11)$$

where $\rho$, $C_p$, and k are the density, the heat capacity, and the thermal conductivity, respectively. The first term on the right describes the heat conduction per unit volume, $Q_{gen}$ is the heat generation rate per unit volume by the cell during charging and discharging and q is the heat transfer rate per unit volume between the cell and its surroundings. Then, q is expressed as $$q = \frac{h}{d}(T - T_{amb.}) \quad (12)$$

where h, d, and $T_{amb}$ are the heat transfer coefficient, cell thickness, and ambient temperature, respectively.

In general, the heat generation rate is calculated as a sum of reversible and irreversible heat generation, which is expressed as $$Q_{gen} = I\left(U_{OCV} - V_T - T \cdot \frac{\partial U_{OCV}}{\partial T}\right) \quad (13)$$

However, the equation above does not include a heat generation term caused by concentration gradients in electrodes, which is called the heat of mixing. The heat of mixing is calculated as a function of changes of equilibrium potentials and ion concentrations in electrodes. As a result, the total sum of all of heat generation source terms can be described as follows;

$$Q_{gen.} = \frac{1}{L}\int_L (\Delta U_{equ}^+ \cdot i(r,l) - \Delta U_{equ}^- \cdot i(r,l))dl + \frac{I}{V}\left(U_{OCV} - V_T - T \cdot \frac{\partial U_{OCV}}{\partial T}\right) \quad (14)$$

Temperature changes in the cell affect chemical reactions and ion mobility. These effects are considered using the Arrhenius equation, where the diffusion coefficient representing ion transport in electrodes is expressed as a function of temperature:

$$D_s = D_{s0} \cdot \exp\left(\frac{E_a}{R}\left(\frac{1}{T_0} - \frac{1}{T}\right)\right) \quad (15)$$

where $D_{s0}$, $E_a$, and R are the diffusion coefficient at temperature of $T_0$, activation energy, and the universal gas constant, respectively. The parameters are determined by curve fitting experimental data to the equation 16 for different temperatures, as shown in Error! Reference source not found.

SOC is defined as a ratio of the releasable charge capacity in a cell ($Q_{releasable}$) to the maximum charge capacity ($Q_{max}$). The preferred SOC reference should be $Q_{max}$ rather than the rated charge capacity of a new cell ($Q_{rated}$) because $Q_{max}$ decreases as the cell ages. With this approach, the SOC range will always be 0-100%. The equation for SOC may be generalized as $$SOC = \frac{Q_{releasable}}{Q_{max}} \quad (17)$$

with coulomb counting, the calculation is as follows $$SOC(t) = SOC(0) - \frac{\int_0^t id\tau}{Q_{max}} \times 100\% \quad (18)$$

The total number of charges that can be obtained in a cell is the same as that of the total charges in the particles of the anode electrode. Therefore, the total number of the charges can be obtained by integrating the volume average charges, $C_{s,ave}$ in all particles. Hence, the maximal releasable charges are the difference between the integrated charges and the number of charges at zero stoichiometric number. Thus, the charges can be expressed as a function of lithium-ion concentration in the electrodes as $$Q_{releasable} = \int_0^{L_-} \epsilon_s FC_{s,ave}Adx - \epsilon_s FC_{s,max}*Stoi0AL_-$$

$$Q_{max} = \epsilon_s FC_{s,max}*(Stoi100-Stoi0)AL_- \quad (19)$$

where Stoi0 and Stoi100 are the stoichiometry values at 0% and 100% SOC, respectively.

Accordingly, SOC is expressed as a ratio of the average lithium concentration to the maximum lithium concentration in the negative electrode from L=0 to L.

$$SOC = \frac{1}{L_-}\int_0^{l_-} \frac{(C_{s,ave} - C_{s,max}*Stio0)}{C_{s,max}*(Stoi100-Stoi0)}dx \quad (20)$$

Simulation results of the reduced order electrochemical thermal model were compared with experimental charging and discharging data at different current rates. The charge rates are 1 C, 2 C, and 5 C at 25° C. Note that a "1 C" charge rate refers to a rate that achieves a full charge in one hour, while a "5 C" charge rate is 5 times as fast. All experimental temperatures were measured with thermocouples placed at the surface of a central position. A full discharge is defined as discharging from 100% SOC to 0% SOC, which corresponds to terminal voltages of 4.15V at a cutoff current of 800 mA and 2.5V, respectively.

Simulated and experimental terminal voltages were compared as shown in Error! Reference source not found. and Error! Reference source not found, where star lines represent simulation data and solid lines represent experiment data (e.g., 1 C (410, 420), (510, 520), 2 C (430, 440), (530, 540), and 5 C (450, 460), (550, 560). Since thermal effects of diffusion are considered, terminal voltage response has been improved significantly, especially for high current rates at charging and discharging, where more heat is generated.

Preferably, the surface ion concentration is the variable that is used to control the amplitude and duration of the charging current. When a battery is fully charged at 5 C current rate, estimated surface ion concentration of the solid particles is shown in Error! Reference source not found, where the X axis represents a through-plane of a single cell that consists of a negative electrode, a separator, and a positive electrode from left to right. Each curve represents surface concentrations of particles at a particular time. When charging begins, ion concentrations are uniform in/at both the positive and negative electrodes, as shown on the curve (610). While being charged, the gradient of ion concentration increases and finally becomes zero. It should be noted that the ion concentration at the negative electrode-separator boundary at 500 s is higher than that at 2400 s. In addition, due to diffusion rate limitations, the ion surface concentration of those particles near negative electrode-separator boundary is higher than that further away, as shown in the curve (620); the inverse is true for the positive electrode-separator boundary.

Figure 7:
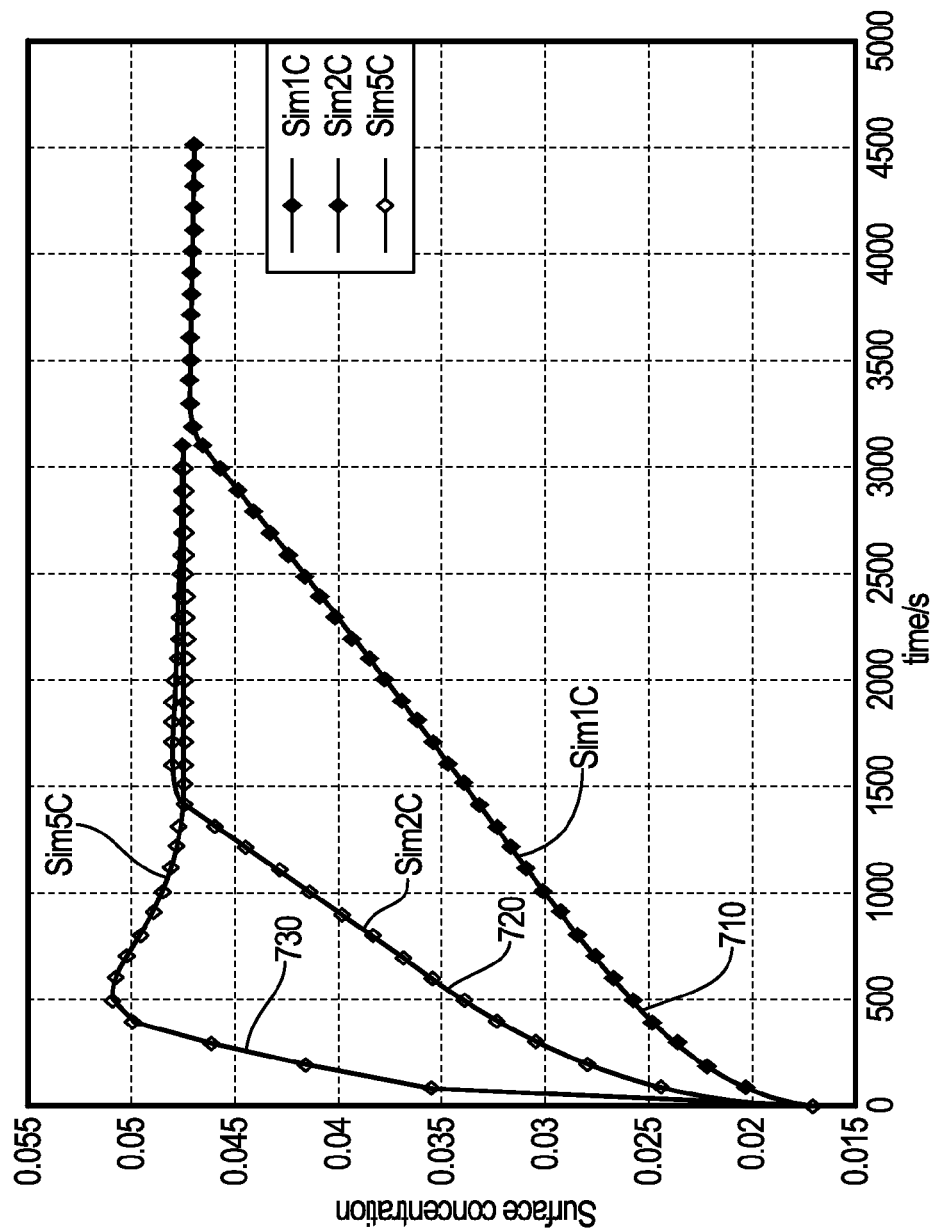
FIG. 7 is a schematic illustration (chart) of estimations of ion surface concentrations of particles at the boundary between the negative electrode and the separator over time during a full charge at different charge rates.

The difference lasts until terminal voltage reaches 4.15V, and CC/CV charging shifts from "CC" mode to "CV" mode. More details of surface concentration in time domain are shown in Error! Reference source not found, where ion concentrations of particles near the separator are plotted. FIG. 7 shows surface ion concentration of particles at the boundary between negative electrode and separator during a full charge with different current rate (e.g., 1 C (710), 2 C (720), and 3 C (730). As can be seen in the curve, the concentration overshoot increases with higher charge current rates, which provides reasons of why more degradation takes place at a large current charging.

As shown above, ion concentration in the electrodes is estimated with Equ. 6. Since the sub-model for ion concentration is reduced in ROM compared to full order model, there will be some estimation errors. The errors can be minimized using a feedback control. The output of the model, including terminal voltage and temperature are compared with measured voltage and temperature, the differences are used as feedback to ROM to improve the accuracy of the model.

Figure 8:
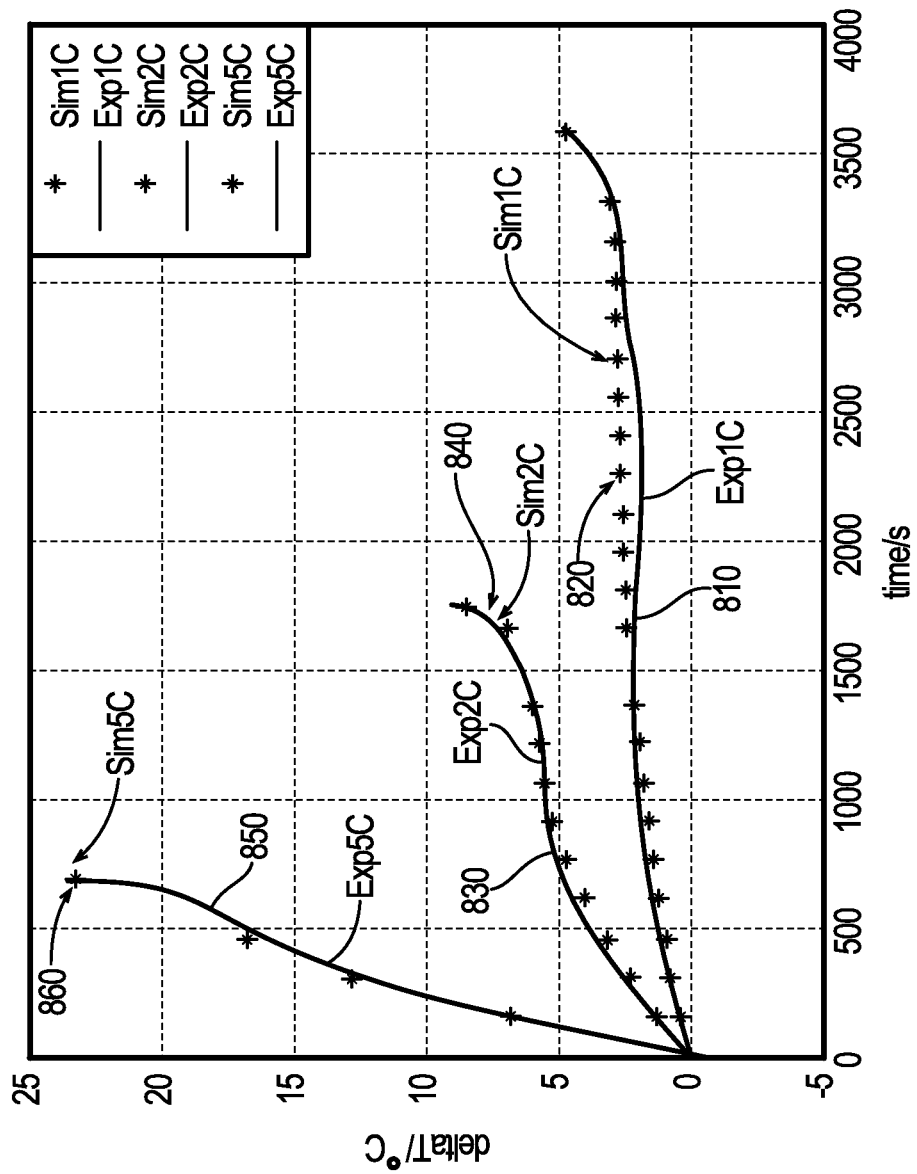
FIG. 8 is a schematic illustration (chart) of simulations of battery temperatures over time at different charge rates during a full discharge, compared with experimentally measured battery temperatures.

Temperature response (temperature changes) of the battery at different current rates is shown in Error! Reference source not found. The estimated trend of temperature change is similar with what happens to the battery. With larger discharging current, more heat is generated, and higher temperature increases are observed. FIG. 8 shows the effect of an increase of temperature during full discharge at different current rate and the asterisk symbols (*) are simulation data and solid lines are experiment data. Individual curves represent 1 C (810, 820), 2 C (830, 840), and 5 C (850, 860) respectively. Ambient temperature was 25° C.

Figure 9:
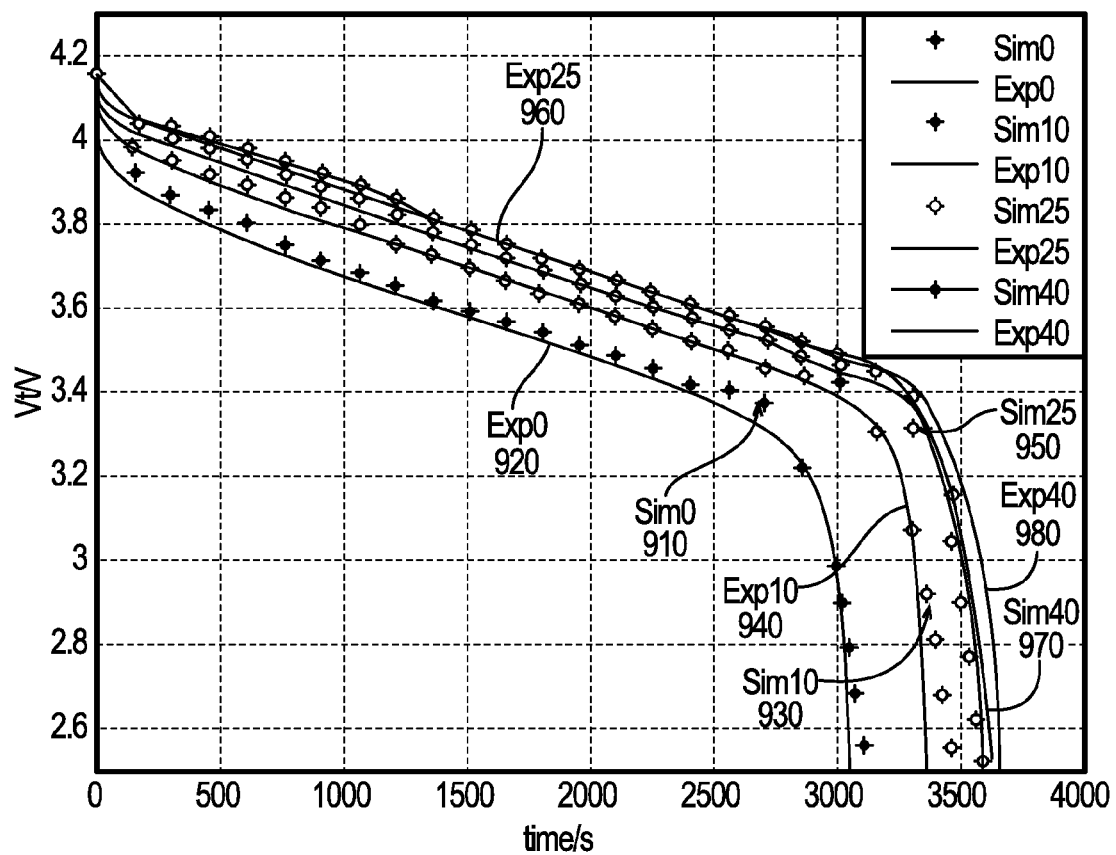
FIG. 9 is a schematic illustration (chart) of simulations of battery terminal voltages over time at different ambient temperatures during a full discharge, compared with experimentally measured battery terminal voltages.
Figure 10A:
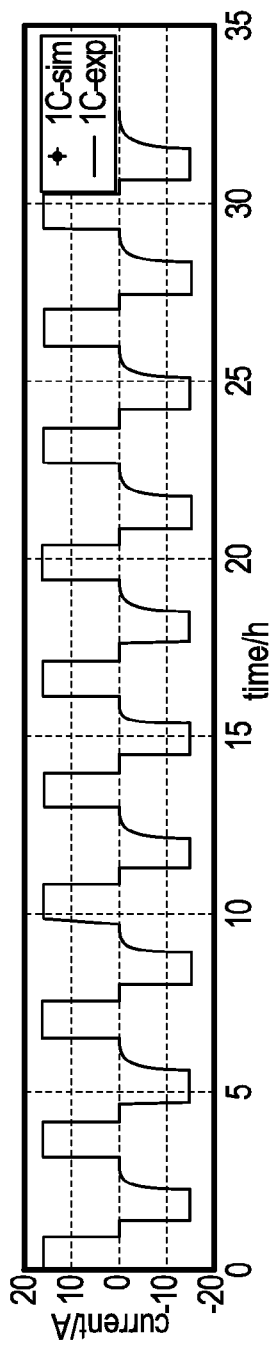
FIG. 10A is a schematic illustration (chart) of results according to a form of the invention, showing battery charging current over time, and comparing predicted battery charging currents according to a model with experimentally measured battery charging currents.
Figure 10B:
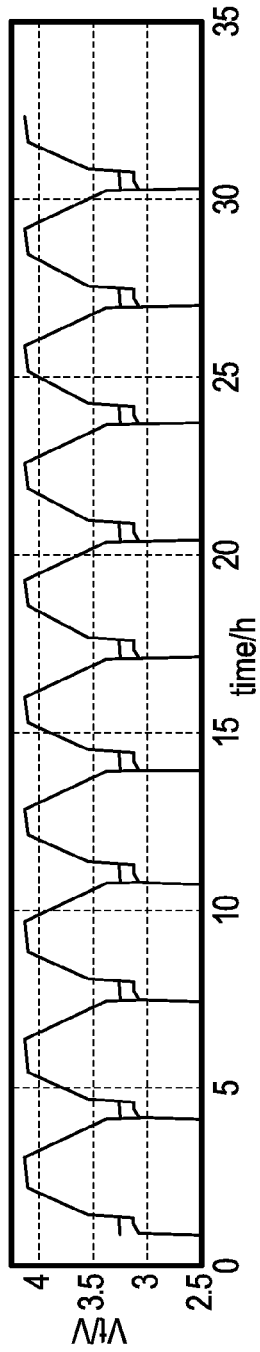
FIG. 10B is a schematic illustration (chart) of results according to a form of the invention, showing battery terminal voltage over time, and comparing predicted battery terminal voltages according to a model with experimentally measured battery terminal voltages.
Figure 10C:
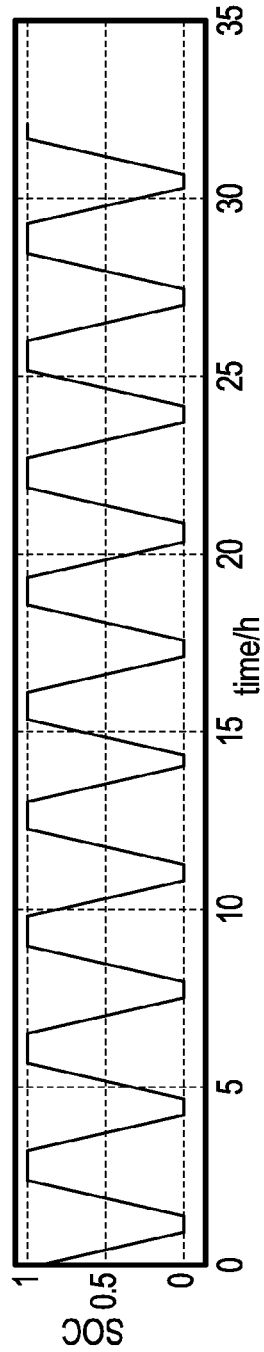
FIG. 10C is a schematic illustration (chart) of results according to a form of the invention, showing battery State Of Charge over time, and comparing predicted battery State of Charge according to a model with experimentally measured battery State Of Charge.
Figure 11:
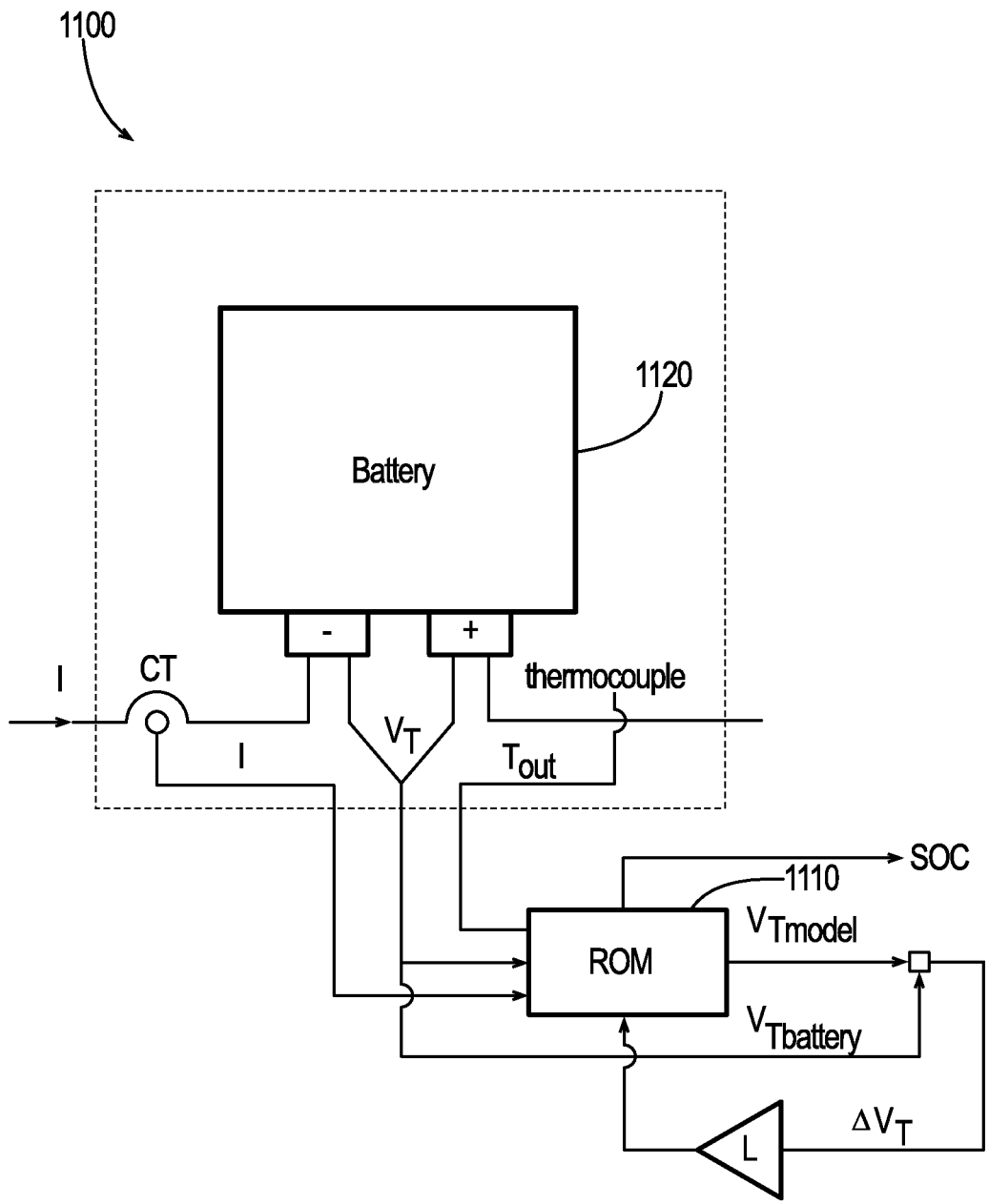
FIG. 11 is a schematic illustration of a battery charging controller and method according to another example embodiment of the present invention.
Figure 12A:
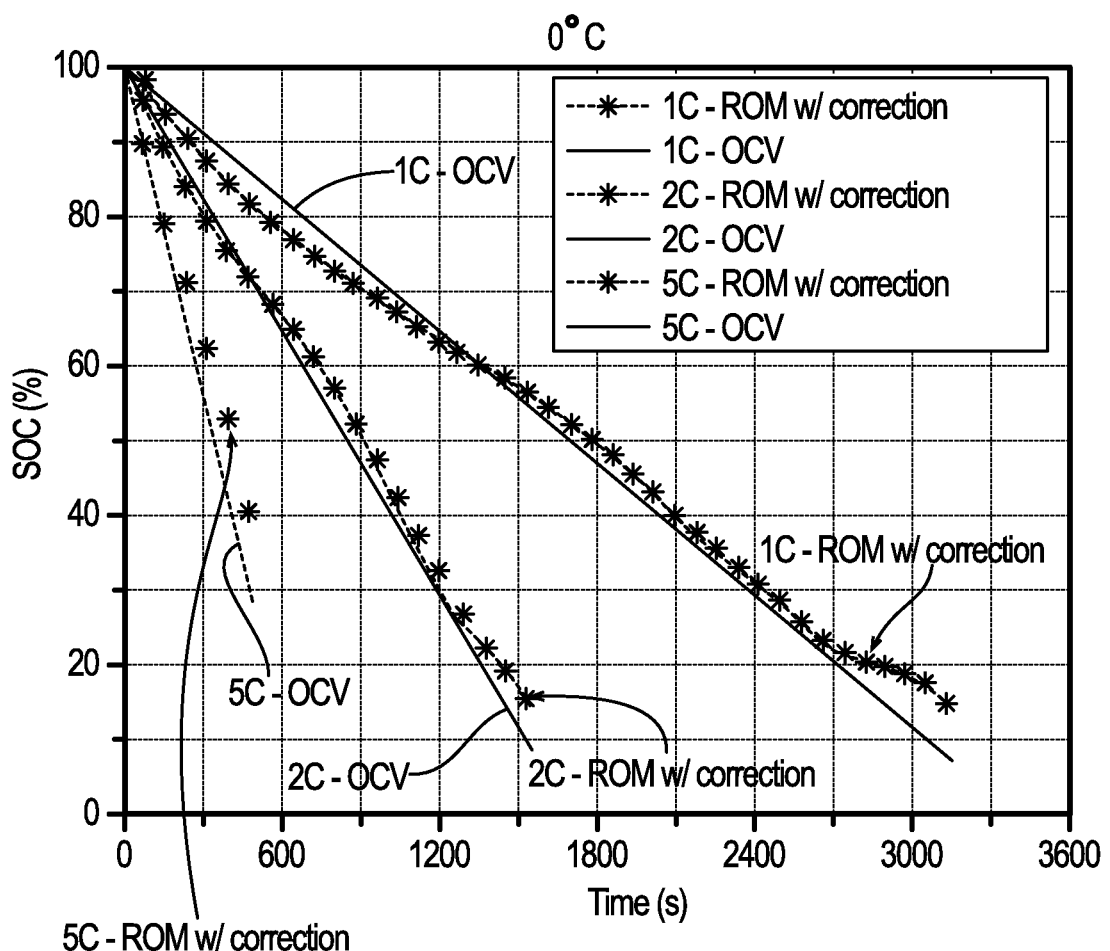
FIG. 12A is a schematic illustration (chart) of results according to a form of the invention at an ambient temperature of 0 degrees Celsius, showing battery State Of Charge over time, and comparing predicted battery State of Charge according to a model with experimentally measured battery State Of Charge.
Figure 12B:
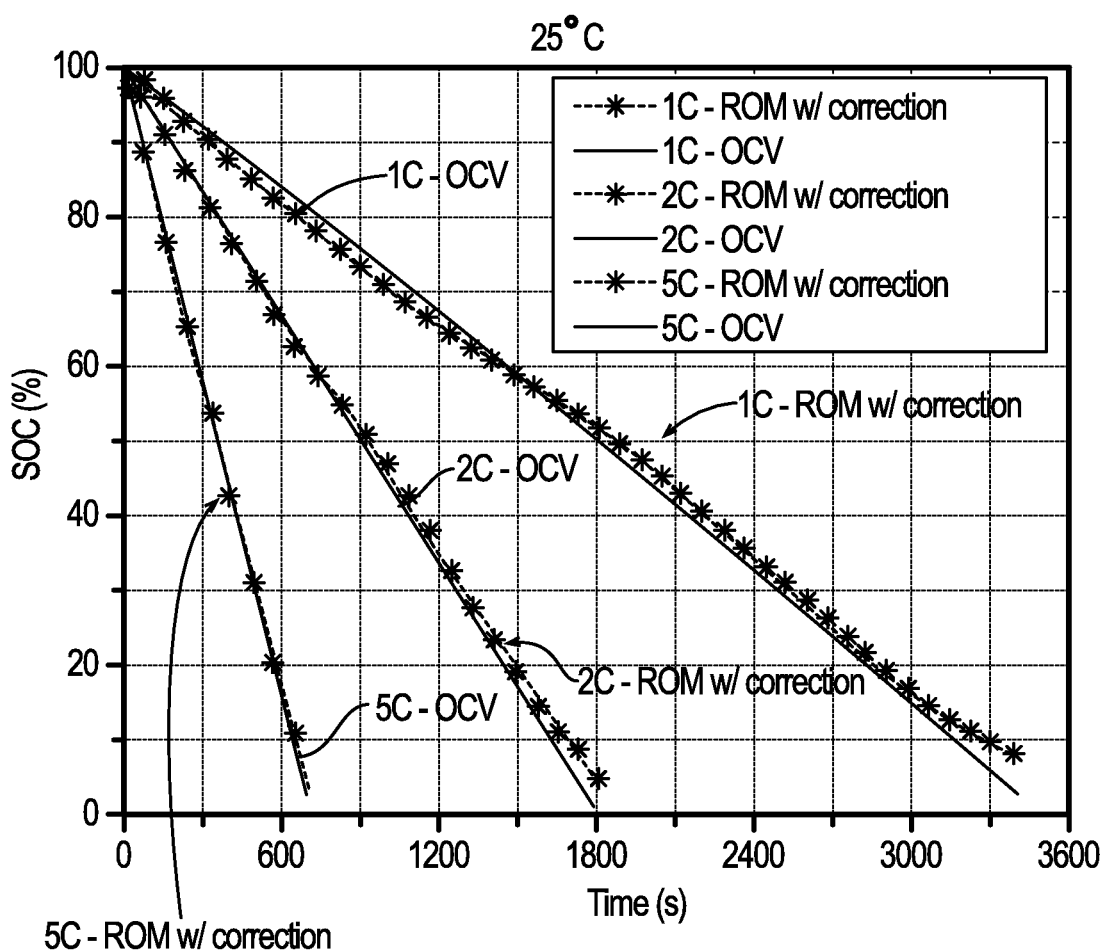
FIG. 12B is a schematic illustration (chart) of results according to a form of the invention at an ambient temperature of 25 degrees Celsius, showing battery State Of Charge over time, and comparing predicted battery State of Charge according to a model with experimentally measured battery State Of Charge.
Figure 12C:
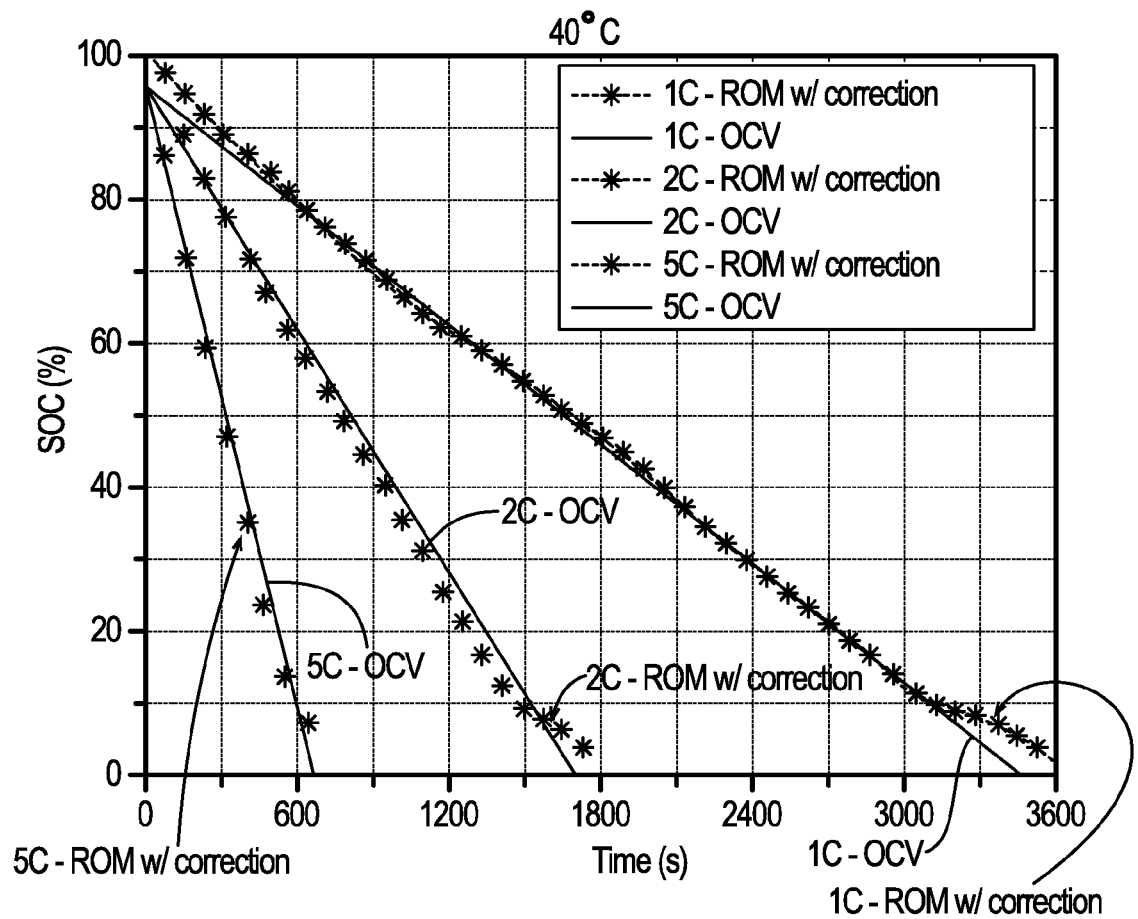
FIG. 12C is a schematic illustration (chart) of results according to a form of the invention at an ambient temperature of 40 degrees Celsius, showing battery State Of Charge over time, and comparing predicted battery State of Charge according to a model with experimentally measured battery State Of Charge.

Simulation results were compared to experimental results at 0, 10, 25, and 40° C. Each was a full discharge at a current rate of 1 C. As shown in Error! Reference source not found, the error increases as ambient temperature decreases. This is due to the $D_s$ curve fitting process in which ambient temperature was assumed to be constant. During low temperature discharge, the change in temperature is larger than during a high temperature discharge. These confidence intervals vary with ambient temperature and cause inaccuracy. In FIG. 9, the response of terminal voltage during 1 C full discharge at different ambient temperature is charted. The asterisk symbols (*) are simulation data and solid lines are experimental data. Results are shown for 0° C. (910, 920), 10° C. (930, 940), 25° C. (950, 960), and 45° C. (970, 980) respectively.

The thermal model will be tested with higher current rates at different temperatures, and more results will be analyzed in future.

After the ROM was validated for single charging and discharging cycles, a long time test was executed at 25° C. ambient temperature. A ten-cycle test was designed, where each cycle consists of a full discharge, a 30 minutes rest after discharging, a full charge, and another 30 minutes rest after charging. Response of the current on the terminal voltage and SOC is shown in Error! Reference source not found.A-10 C. The results demonstrate that both estimation of terminal voltage and SOC are accurate at multiple cycles, which implies numerical stability. However, voltages during rests show discrepancies that should be improved by either modification of the model or use of a feedback loop.

A new ROM has been developed that includes a thermal component which simulates the temperature of a cell. Simulated results for terminal voltage more closely match those of experimental data once thermal effects were accounted for in the model. This is due to the inclusion of $D_s$ as a function of temperature. Previously models assume $D_s$ to be constant at all temperatures; however, it has been shown that $D_s$ will change exponentially with temperature. Preferably, the diffusion coefficient, $D_s$, is continuously updated as a function of temperature. With an increase in current comes an associated increase in heat generation rate. This explains why previous models have greater error at high current rates. The accuracy of terminal voltage and cell temperature is significantly improved compared to previous models without any thermal consideration.

Steady state error for SOC estimation error is nearly zero, when compared with the coulomb counting. Simulated temperature data closely matches experimental thermocouple data. The absolute error of the simulated temperature is less than 1.5° C., which accurately represents temperature behavior of the cell accomplished by considering $D_s$ as a function of the temperature. In addition, the computational time is drastically reduced. It approximately takes 15% of the computational time of the FOM. Comparisons for both models are shown in Table 1. The ROM is not validated for low ambient temperatures below 0° C. and a high current rate that is larger than 5 C.

TABLE 1

| Model | Computation time, in seconds | | |
|---|---|---|---|
| | Full discharge@1 C | Full discharge@2 C | Full discharge@5 C |
| Full order model | 79 | 45 | 26 |
| Reduced order model | 8.7 | 3.9 | 2.7 |

The SOC can be directly estimated using Equation (20) where the concentration is obtained from the ROM. However, a mismatch between the ROM and the battery cell causes steady state and dynamic errors that can be corrected either empirically or by using a feedback loop.

According to a previous study, the empirical method has shown an immaculate accuracy during a single discharge and single cycle loading, but pulse and long-term accuracy is questionable. The error rates are not adjustable so if the dynamics of a battery differ much from those used for error rate calculations then error will grow radically. The second SOC estimation algorithm with error correction using a feedback loop is promising and can potentially remove those errors.

A schematic block diagram for the method and apparatus according to one aspect of the invention is shown in Error! Reference source not found, where a feedback loop actively attempts to minimize the errors by comparing the battery terminal voltage with the estimated battery terminal voltage according to the ROM. A state space observer model is applied to design the feedback loop. The difference in terminal voltage ($\Delta V_T$) between the ROM and the battery is treated as a new error term, so the state space model is of the form:

$$S^{k+1} = A \cdot S^k + Bu + L \cdot \Delta V_T$$

$$V_T^{k+1} = C \cdot S^{k+1} + Du \quad (21)$$

where L is an observer gain, S is the stoichiometry number, which is related to $c_{s,ave}$ and subsequently SOC, to be discussed later.

This representation demonstrates that L must be a vector. First, an appropriate correction term insertion point must be determined. The model function containing $c_{s,ave}$ is discretized:

$$\frac{c_{s,ave}^{k+1} - c_{s,ave}^k}{\Delta t} = -3 \frac{j^{Li}}{R_s a_s F} \quad (22)$$

Then k and k+1 terms are separated as shown, $$c_{s,ave}^{k+1} = c_{s,ave}^k - 3 \frac{j^{Li}}{R_s a_s F} \cdot \Delta t \quad (23)$$

in order to solve all k+1 terms simultaneously with the accompaniment of all the other unaffected equations in the model. Since $c_{s,ave}$ is nonlinear through the thickness of an electrode, an average value of all particles across the electrode thickness is used to calculate SOC using S in the equation $$SOC = \frac{S - S_0}{S_{100} - S_0} \quad (24)$$

where $S = \overline{c_{s,ave}}/c_{s,max}$.

If the previous equation for $c_{s,ave}$ is altered by substituting in the average values of $c_{s,ave}$ and $j^{Li}$ then dividing through by $c_{s,max}$ the equation for the anode, with inclusion of error correction, becomes $$S^{k+1} = A \cdot S^k + Bu + L \cdot \Delta V_T \rightarrow S^{k+1} = \quad (25)$$
$$S^k - \frac{1}{c_{s,max}} \frac{3 \cdot I}{R_s a_s FA\delta} \cdot \Delta t + L \cdot \Delta V_T \cdot \Delta t$$

where new coefficients for the A and B matrices are shown.

When the state space output is derived after linearization of $S_1$ So the C and D matrix coefficients remain unchanged in $$V_T^{k+1} = OCV - \eta \rightarrow V_T^{k+1} = C \cdot S^{k+1} + Du \quad (25)$$

The observer gain vector (L) consists of 3 sections to account for the anode, cathode, and separator. In accordance with charge conservation laws, whatever value is subtracted from the anode must be added to the cathode typified in the equation $$[l \cdot \delta \cdot \epsilon_s]_{anode} = -[l \cdot \delta \cdot \epsilon_s]_{cathode}$$

where A and F were on both sides but cancelled out and L in the separator region is 0.

So L takes the form of $$L = \begin{bmatrix} -36.4 \times 10^{-4} \cdot 0.5 \\ \vdots \\ -36.4 \times 10^{-4} \cdot 0.5 \\ 0 \\ \vdots \\ 0 \\ 50 \times 10^{-4} \cdot 0.58 \\ \vdots \\ 50 \times 10^{-4} \cdot 0.58 \end{bmatrix} \begin{matrix} \}anode \\ \\ \}separator \\ \\ \}cathode \end{matrix} \cdot l \quad (26)$$

where l is optimized by pole placement. The resulting desired pole was −0.5 with an associated gain of l=0.0442.

The SOC estimation with feedback is applied to the single discharge data as shown Error! Reference source not found.A-12 C. The results show a significant improvement in SOC estimation accuracy in all cases. At low temperature the ROM with feedback proves advantageous over the ROM without the feedback, but the opposite is true at high temperature with the difference being less than 1% SOC. Its average error was <5% SOC in every case.

Using the ROM, the charging profiles are derived and simulated. The charging current is a pulse form that allows for controlling the level of ion concentrations. The pulsing current can be formed by a combination of charging, resting and discharging, which can be called a two-level or a three-level pulse charging.

Figure 13A:
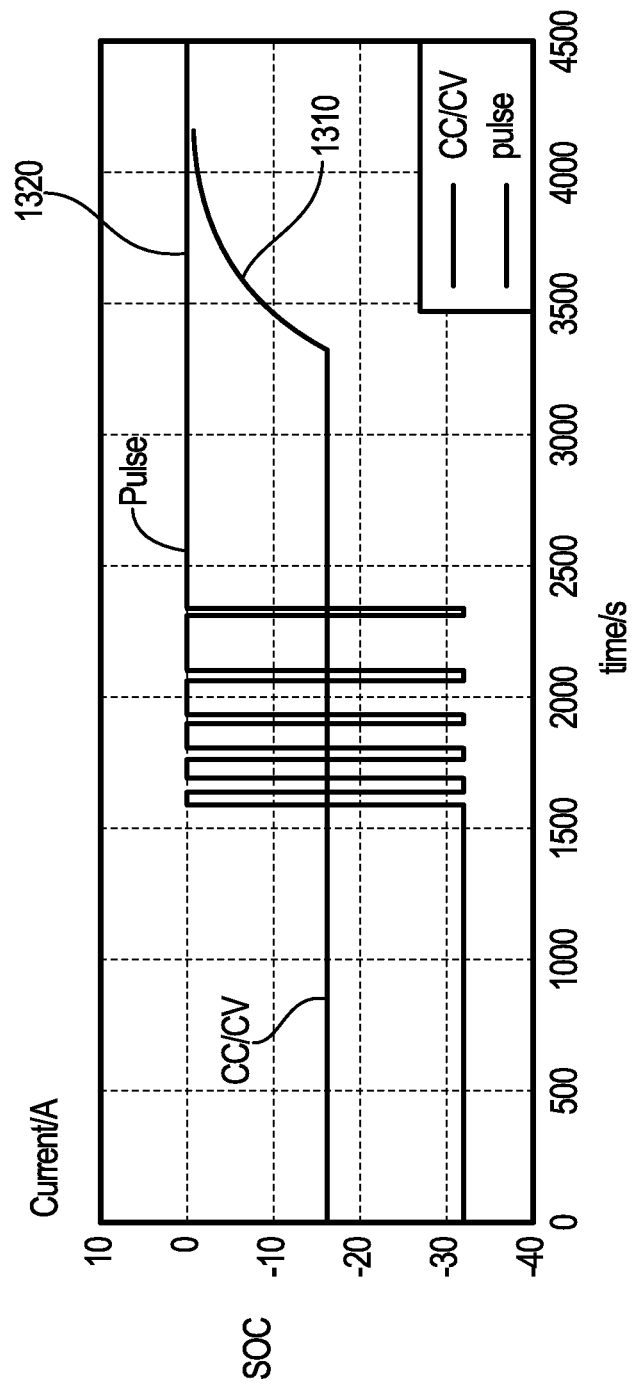
FIG. 13A is a schematic illustration (chart) of simulated results according to a form of the invention using a 2-level charging profile, showing predicted battery charging currents according to a model.
Figure 13B:
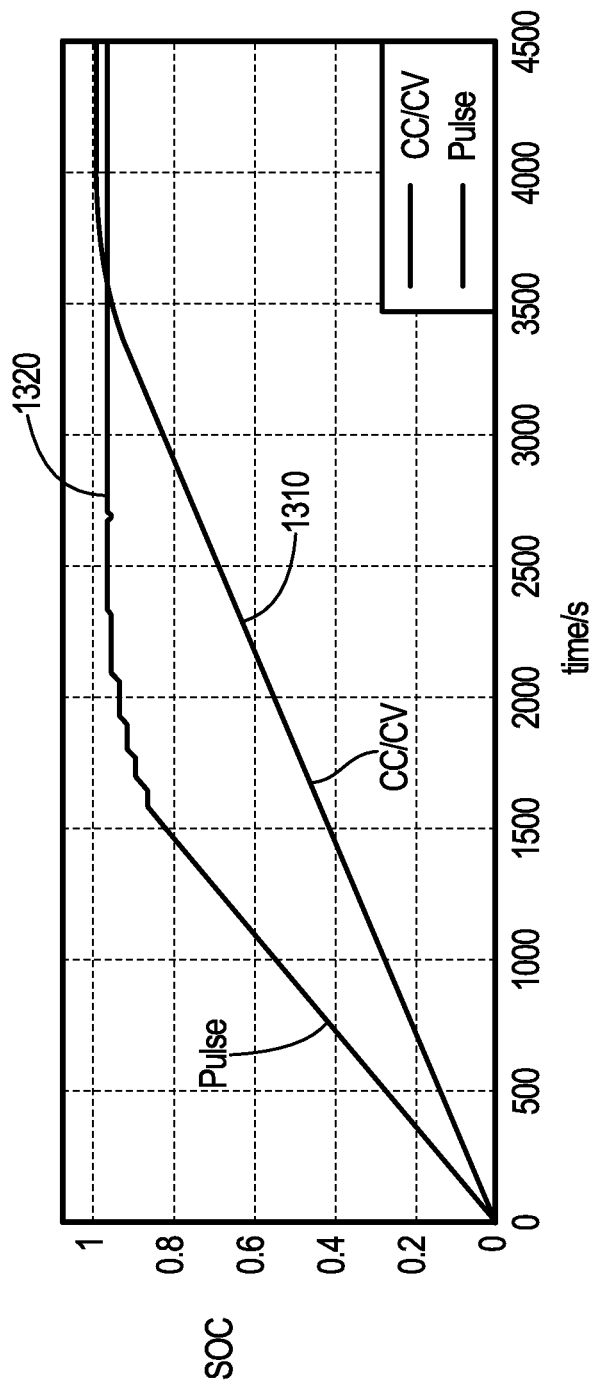
FIG. 13B is a schematic illustration (chart) of simulated results according to a form of the invention using a 2-level charging profile, showing predicted battery State Of Charge levels according to a model.
Figure 13C:
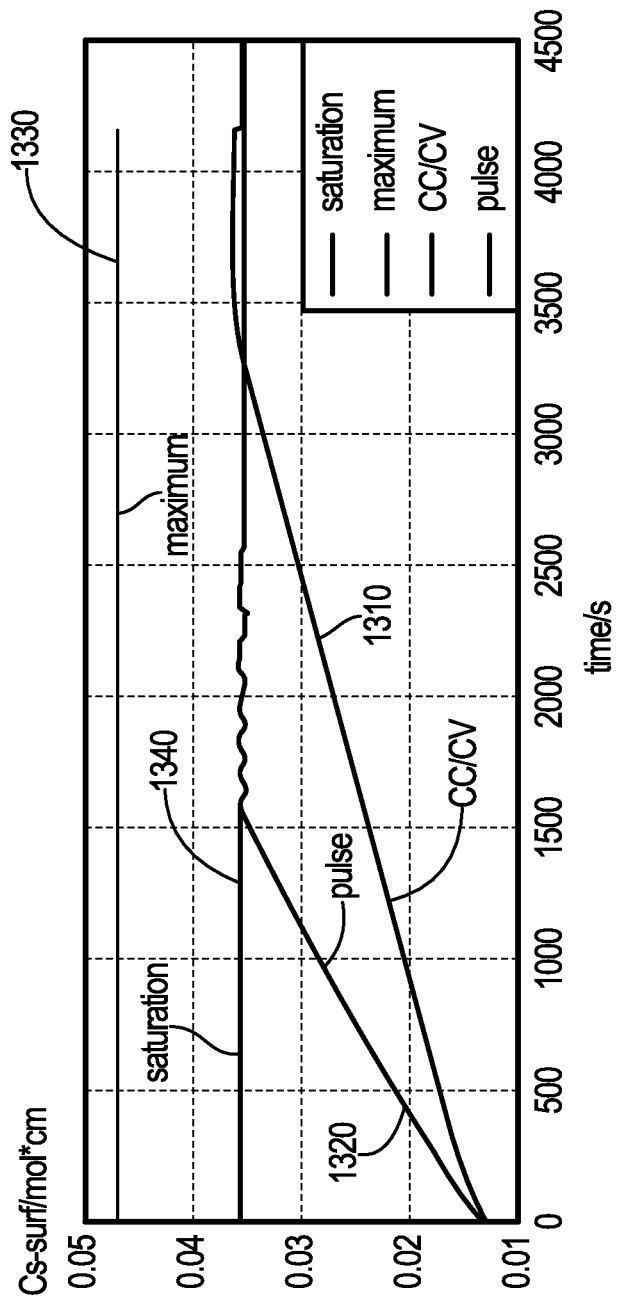
FIG. 13C is a schematic illustration (chart) of simulated results according to a form of the invention using a 2-level charging profile, showing predicted ion surface concentrations according to a model.
Figure 14A:
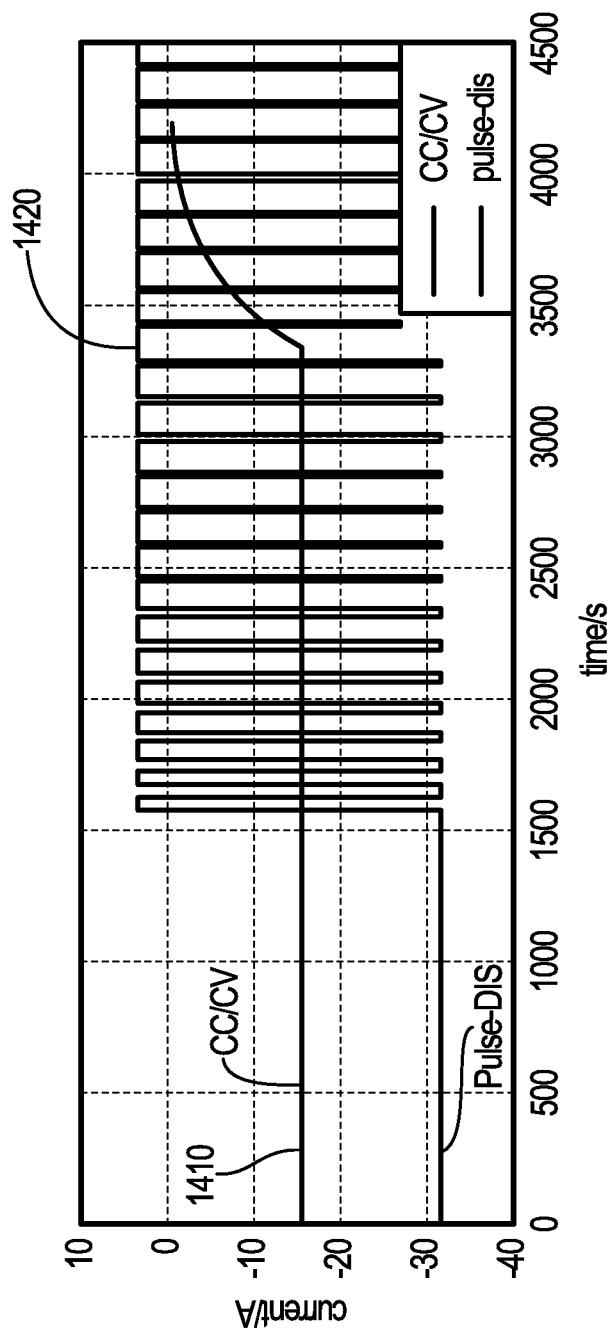
FIG. 14A is a schematic illustration (chart) of simulated results according to a form of the invention using a 3-level charging profile, showing predicted battery charging currents according to a model.
Figure 14B:
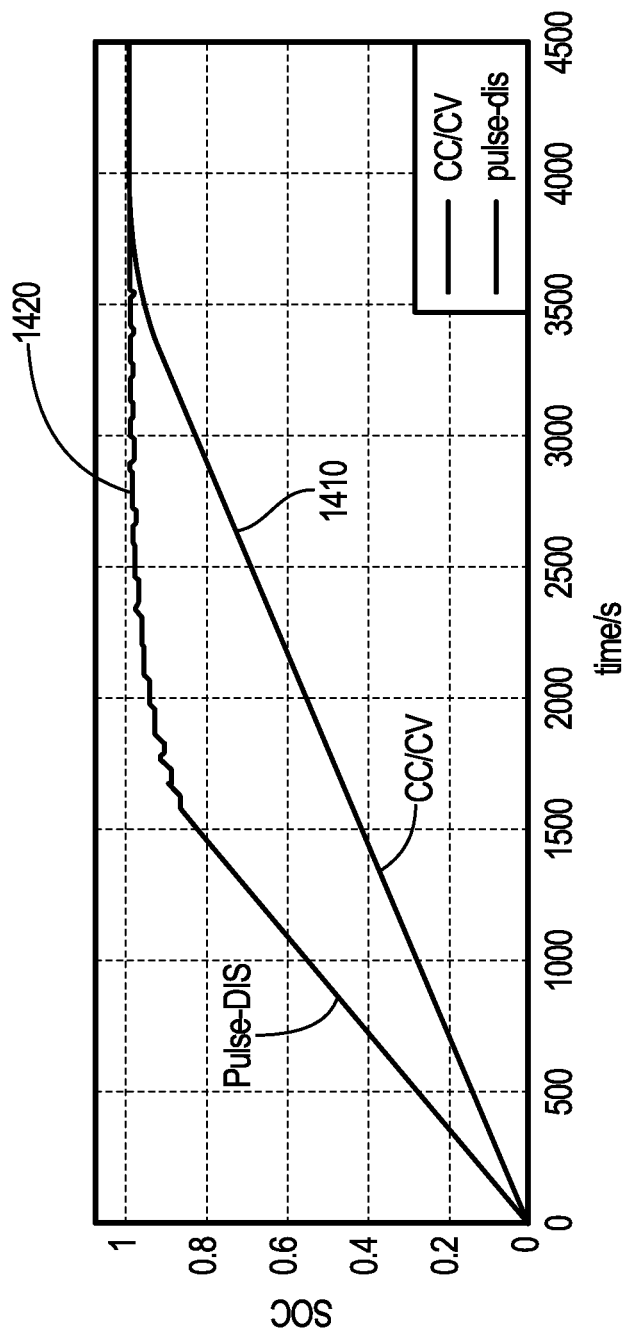
FIG. 14B is a schematic illustration (chart) of simulated results according to a form of the invention using a 3-level charging profile, showing predicted battery State Of Charge levels according to a model.
Figure 14C:
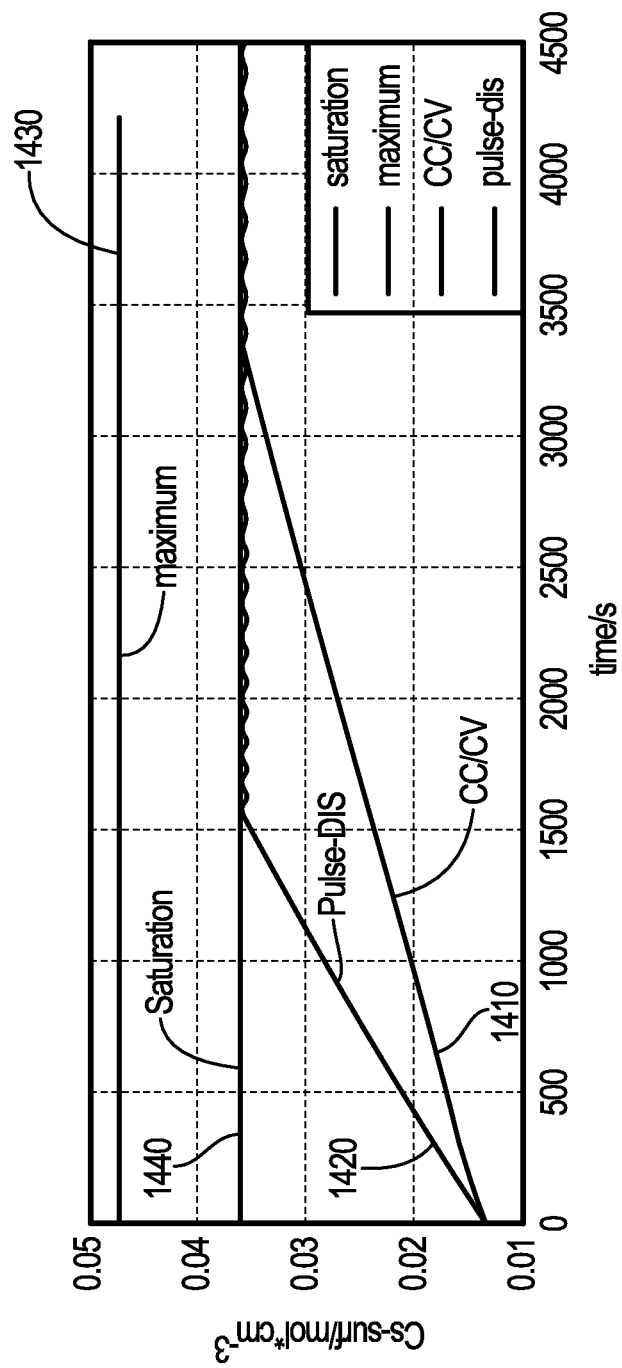
FIG. 14C is a schematic illustration (chart) of simulated results according to a form of the invention using a 3-level charging profile, showing predicted ion surface concentrations according to a model.

The first simulation results of current, SOC, and surface concentration of the negative electrode at CC and CV and the two-level pulse charging are shown in Error! Reference source not found.A-13 C. The current rate for CC and CV charging is 2 C, while the pulse charging is with 4 C. Increase of SOC at charging is shown in the second figure (FIG. 13B), where the slope of the two charging methods is different from each other. A maximum allowable concentration and saturated concentration is shown in the third figure (FIG. 13C), where no overshoot in the concentration is ensured, even though the pulse charging current rate is two times higher than the constant current. The charging current is controlled by the surface ion concentration and limited to a preset saturation concentration, where the charging current is turned off and discharged until the concentration drops, when the concentration exceeds the limit. In this way, charging is held as close to the maximum permitted rates without causing excessive ion concentration build-up which decreases battery capacity or lifespan.

Simulation results of a 3-level pulse charging method are shown in Error! Reference source not found.A-14 C. As an example, the charging will stop and a small rate discharge is executed to decrease ion surface concentration, as the ion surface concentration of the negative electrode reaches its upper limit. With the same charging time, the SOC of this novel charging method has been reached faster than that of the previous (prior art) two-level charging methods. (Note: CC/CV (1410), pulse-dis (1420), maximum (1430), saturation (1440)).

The new charging method according to the present invention can be implemented in a test station and a series of tests was conducted as shown in Table 2. Firstly, three fresh cells were cycled at 25° C., including full discharge at 2 C, rest, full charge, and another rest. The first cell was charged with CC and CV mode at 4 C; the second cell was charged with pulse mode at 4 C; and the third cell was charged with CC and CV mode at 2 C.

TABLE 2

Test matrix

| Cell No. | Ambient temperature (° C.) | Charging method | Charging current (C) | Cycles |
|---|---|---|---|---|
| 1 | 25 | CC/CV | 4 C | 100 |
| 2 | 25 | Pulse | 4 C | 100 |
| 3 | 25 | CC/CV | 2 C | 100 |

Figure 15A:
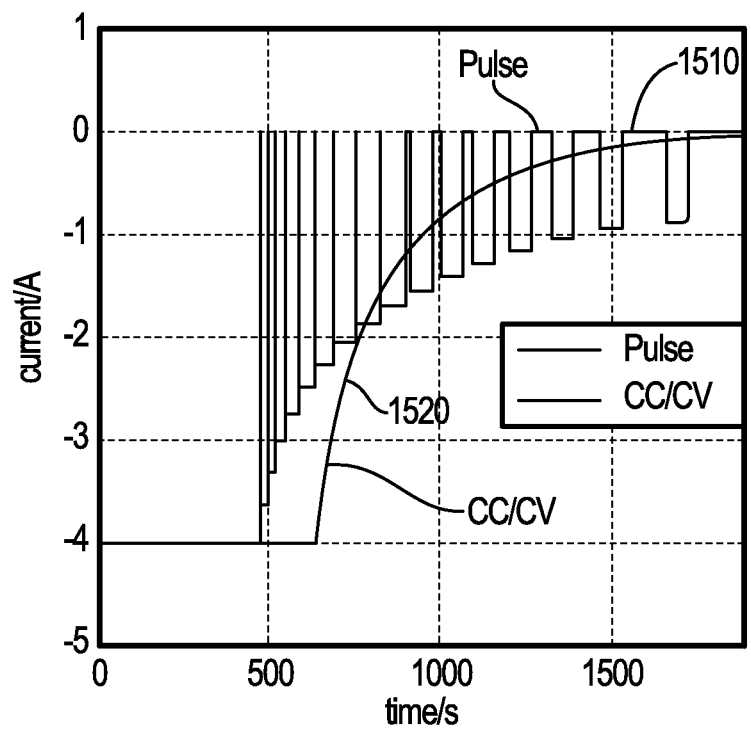
FIG. 15A is a schematic illustration (chart) of experimental results according to a form of the invention comparing battery charging currents according to a prior art CC/CV charging profile and a charging profile as applied by the present invention.
Figure 15C:
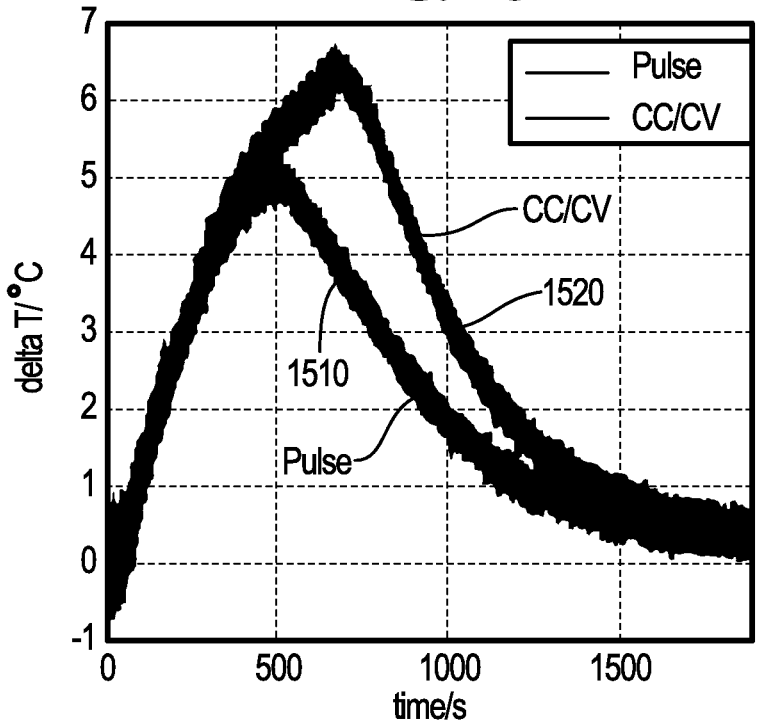
FIG. 15C is a schematic illustration (chart) of experimental results according to a form of the invention comparing battery temperature changes according to a prior art CC/CV charging profile and a charging profile as applied by the present invention.
Figure 15B:
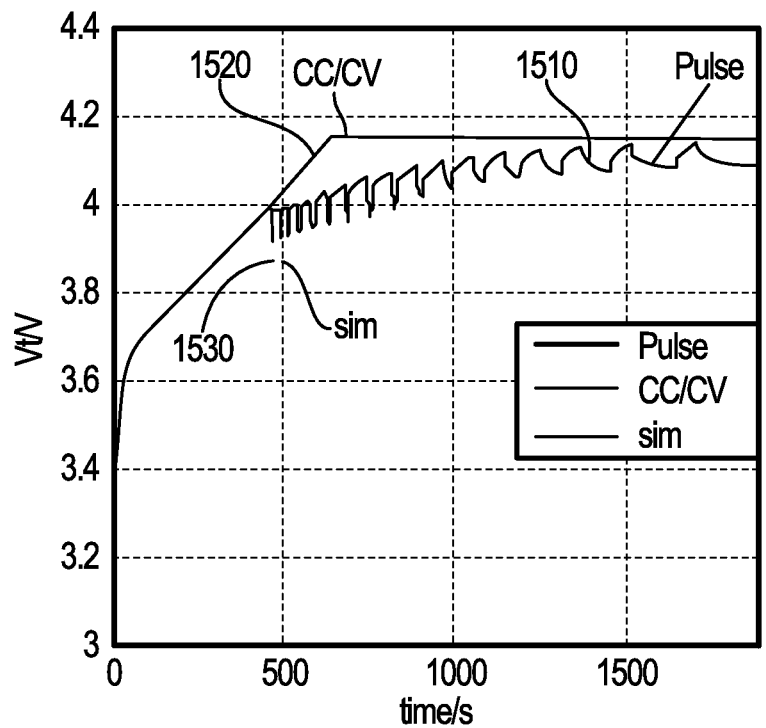
FIG. 15B is a schematic illustration (chart) of experimental results according to a form of the invention comparing battery terminal voltages according to a prior art CC/CV charging profile and a charging profile as applied by the present invention.

Results of a single cycle test are shown in Error! Reference source not found.A-15 D. Error! Reference source not found.A-15 D show pulse and CC and CV charging. Error! Reference source not found.A shows current, Error! Reference source not found.B shows terminal voltage, Error! Reference source not found.C shows temperature rise, Error! Reference source not found.D shows ion concentrations using pulse charging by a two-level charging controlled by the surface concentration. Once concentration reaches its upper limit, the current is turned off and the cell takes a rest. However, this pulsed current causes a terminal voltage ripple that rises during the charging and decreases during discharging. In order to reduce the voltage ripples, the discharging current ripple is further reduced exponentially. (Note: curve (1530) in FIG. 15B depicts simulated results).

Figure 15D:
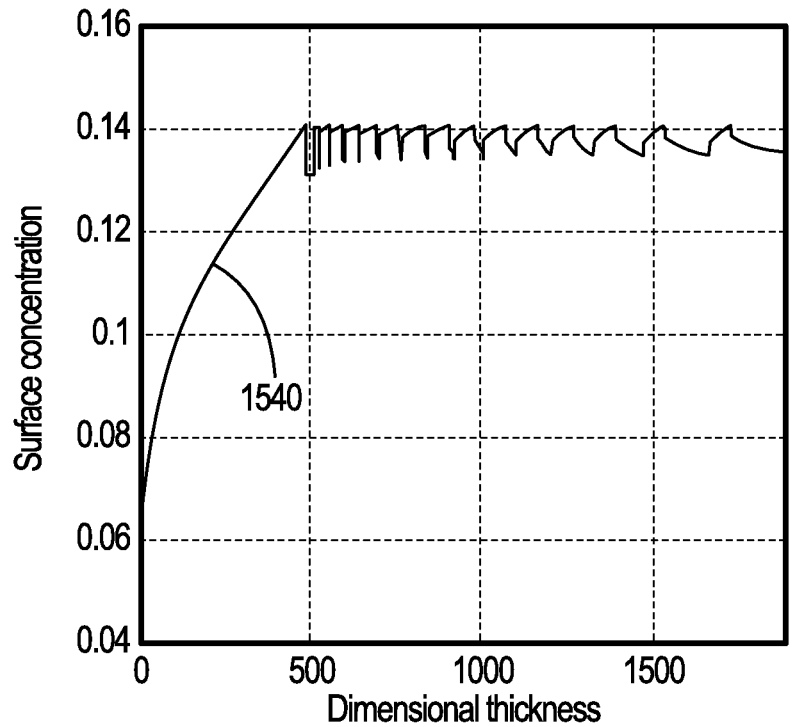
FIG. 15D is a schematic illustration (chart) of experimental results according to a form of the invention comparing ion surface concentrations according to a prior art CC/CV charging profile and a charging profile as applied by the present invention.
Figure 16:
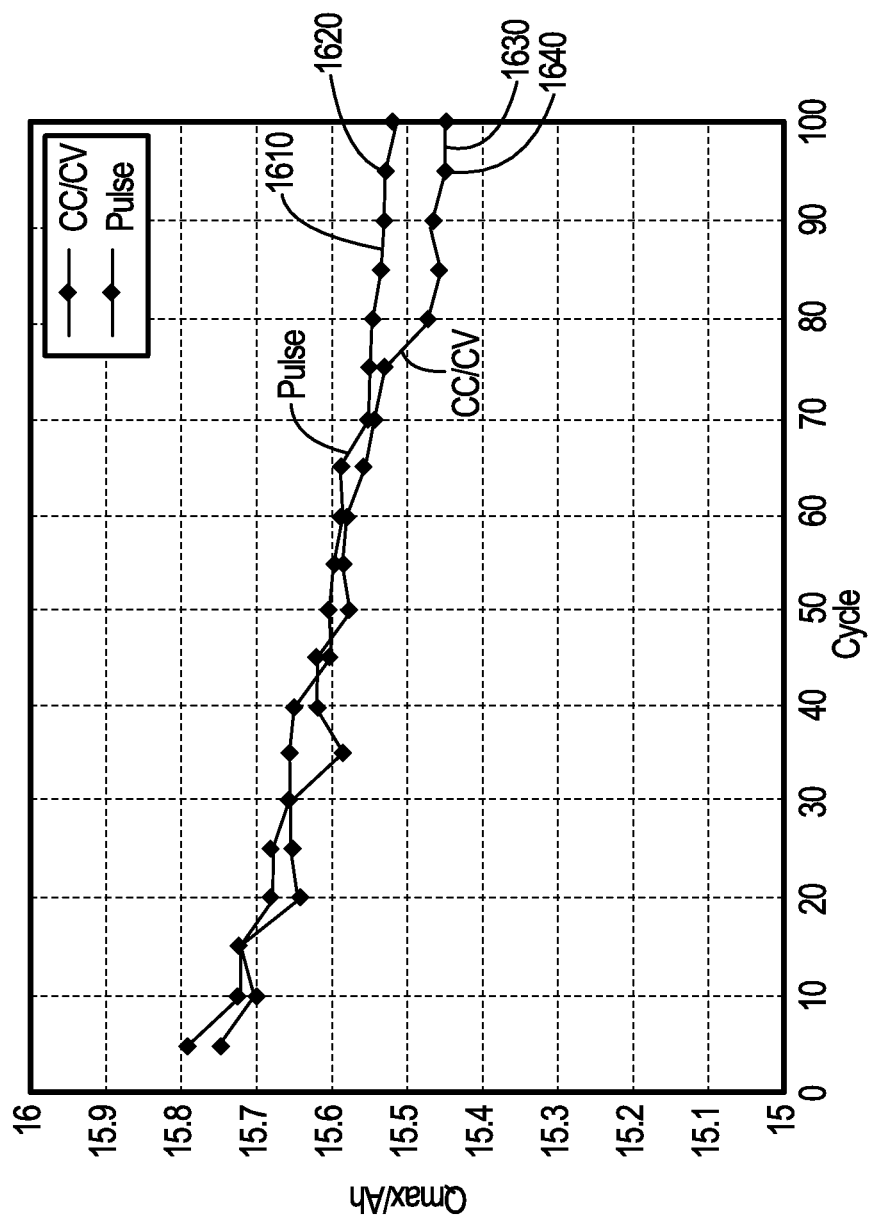
FIG. 16 is a schematic illustration (chart) of experimental results according to a form of the invention comparing Qmax data according to a prior art CC/CV charging profile and a charging profile as applied by the present invention.

As shown in FIG. 15D, the surface concentration that otherwise causes an overshoot shown in Error! Reference source not found. is well kept under the maximum saturation concentration, so the excessive ion concentration at the surface is also prevented. In addition, the temperature rise is less than that of CC and CV charging, which shows other advantages that degradations by the elevated temperature can be minimized.

A cell was tested for multiple cycles with the first and second condition listed in Table 2. In order to assess cell degradation, the maximum capacity, $Q_{max}$, is measured in every 5 cycles during 100 cycles. For a measurement of $Q_{max}$, the battery is charged with in CC/CV mode with 1 C current rate at the first and then rested for 10 minutes. Then, $Q_{max}$ is measured during 1 C discharge rate at 25° C. The maximum capacity for two different charging methods is plotted in Error! Reference source not found, where $Q_{max}$ decays when the number of cycles increases. The red (solid line—1630, stars—1640) and blue (solid line—1610, stars—1620) stars represent for $Q_{max}$ with CC/CV charging mode and the proposing charging method, respectively. It is to recognize that $Q_{max}$ of both charging method decreases linearly. However, the decay slope of the proposing method is lower than that of the classical CC and CV charging. The battery using the pulse charging lost an amount of capacity of 0.24 Ah after 100 cycles compared to 0.34 Ah by the CC and CV. This proves that limitation of the surface concentration of particles in the negative electrode reduces charging capacity losses which would otherwise be caused by a relatively high charging current.

The methods and apparatus of the present invention have numerous advantages. First of all, the new approach is fast. It also avoids harming the battery's capacity or life. Indeed, the invention can be used to achieve some combination of charging speed, protecting battery capacity, protecting battery life. In some applications, normal battery charging rates will be acceptable, but protecting battery capacity is paramount. The present invention can achieve that goal by avoiding the harmful build-up of ion concentrations at the negative electrode while still providing a suitable rate of charge.

The generally-immeasurable ion surface concentrations in the electrodes are estimated using a reduced order model that is based on electrochemical thermal principles. The model is capable of being estimate not only the surface ion concentrations, but also effects of ambient temperature on the internal variables in a real time. In addition, SOC is predicted using the average concentration in the electrodes. Both the surface ion concentration and the SOC are used to control generate a profile of charging currents. Various investigations presented above show that the proposing method can either reduce the charging time by an amount of 30-40% or prevent the cell from ageing or degradation phenomena caused by excessive ion concentrations at the electrodes. The experimental data shows that the capacity losses after 100 cycles at 4 C charging rate is 0.1 Ah less than the conventional CC and CV charging.

The new charging algorithm is based on ion concentrations at surfaces and in particles that are estimated using an experimentally validated Reduced Order of Electrochemical Thermal Model (ROM). The ion concentration at the surface is used to limit the amplitude and duration of the charging current, while the average ion concentration is used to calculate the state-of-charge. The ROM performs at least ten-fold faster in calculations (simulations) than the original full order model, which allows for real time applications. The simulation and experimental results show that the charging time can be reduced to 60-70% of that of the classical CC/CV by preventing excessive ions that accelerate degradation and capacity losses.

The method can be used for a variety of different applications, including: 1) Identical charging time with an extended lifespan, 2) Reduced charging time with the same lifetime, and 3) Reduced charging time and extended lifespan. It should be noted that the principles of this invention can be applied for discharging of lithium battery as well as for charging and discharging of other battery technologies.

The specific techniques and structures employed to improve over the drawbacks of the prior devices and accomplish the advantages described herein will become apparent from the following detailed description of example embodiments and the appended drawings and claims.

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. A method of charging a lithium ion battery having an electrode and comprising:
   (a) applying a charge to the battery using a charging profile;
   (b) monitoring a terminal voltage of the battery while applying the charge using the charging profile;
   (c) using a reduced order mathematical model to estimate a desired lithium ion concentration at an electrode of the battery and to estimate a predicted terminal voltage;
   (d) using the monitored terminal voltage of the battery and the predicted terminal voltage estimated from the reduced order model to calculate an error between the two;
   (e) applying the error to the desired lithium ion concentration to calculate a predicted lithium ion concentration;
   (f) comparing the predicted lithium ion concentration with the desired lithium ion concentration; and
   (g) modifying the charging current and/or voltage applied by the charging profile to urge the predicted lithium ion concentration toward the desired lithium ion concentration, whereby rapid charging of the battery can be obtained while avoiding or minimizing deleterious effects from excessive lithium ion concentrations.

2. The method of claim 1, wherein the charging profile includes a pulsed charging current.

3. The method of claim 1, wherein the charging profile comprises a combination of positive, negative and zero charge currents.

4. The method of claim 1, wherein the lithium ion concentration comprises a surface ion concentration at a negative electrode of the battery.

5. The method of claim 1, wherein the desired lithium ion concentration is estimated as a function of measured current, measured terminal voltage, or temperature.

6. The method of claim 1, wherein the desired lithium ion concentration is estimated as a function of measured current, measured terminal voltage, and temperature.

7. The method of claim 1, wherein the mathematical model produces as outputs (1) estimated surface ion concentration, (2) estimated SOC, and (3) estimated terminal voltage.

8. The method of claim 7, wherein the estimated terminal voltage is compared with a measured terminal voltage to determine a relative error between the mathematical model and the actual battery, and wherein the relative error is used to modify the desired lithium ion concentration of the model that is compared with the predicted lithium ion concentration.

9. The method of claim 8, wherein the relative error is used to produce a two-level cycling charging profile using charging cycles and discharging cycles.

10. The method of claim 8, wherein the relative error is used to produce a three-level cycling charging profile using charging pulses, rest, and discharging pulses.

11. The method of claim 10, wherein the reduced order model based on electrochemical and thermal principles is continuously adjusted based on errors between the predicted terminal voltage and the monitored terminal voltage in real time.

12. A method for charging a rechargeable battery using a charging profile, the battery of the type having an internal characteristic which is difficult or impractical to measure directly, the method comprising the steps of:
  estimating the internal characteristic of the battery;
  measuring the terminal voltage of the battery during charging, rest and discharging;
  comparing the measured terminal voltage with a predicted terminal voltage to establish a voltage error, wherein the predicted terminal voltage is estimated based on a reduced order mathematical model;
  calculating a predicted ion concentration at an electrode of the battery using the voltage error;
  comparing the predicted ion concentration with a reference ion concentration and obtaining an ion concentration error; and
  adjusting the charging profile by using the ion concentration error in order to urge the estimated internal characteristic toward a desired level during the charging.

13. The method as claimed in claim 12 wherein the battery is a lithium ion battery and the error is used to allow the ion concentration of the lithium ion battery, which is difficult or impractical to measure directly, to be used to control the charging of the battery so as to avoid reaching undesirably high concentrations of ions during the charging, rest and discharging, thereby enabling rapid charging thereof without causing the battery capacity to fade.

14. A method of charging a battery having a pair of terminals, the method comprising the steps of:
  (a) applying a charge to the battery using a charging profile;
  (b) measuring a terminal voltage of the battery while applying the charge using the charging profile;
  (c) using a reduced order mathematical model to estimate a desired temporal state of charge of the battery and to estimate a predicted terminal voltage; and
  (d) using the measured terminal voltage of the battery and the predicted terminal voltage estimated from the reduced order model to calculate an error between the two;
  (e) applying the error to the desired temporal state of charge of the battery to calculate a predicted state of charge of the battery;
  (f) applying the error to a desired ion concentration at a terminal of the battery estimated using the reduced order model to calculate a predicted ion concentration; and
  (g) modifying the charge applied by the charging profile, considering an error between the desired ion concentration of the model and the predicted ion concentration, to urge the calculated state of charge of the battery toward the desired temporal state of charge of the battery, whereby rapid charging of the battery can be obtained while avoiding or minimizing deleterious effects on the battery from excessively high temporal charging rates.

15. The method of claim 14, wherein the battery is a lithium ion battery and the charge applied by the charging profile is controlled to avoid excessive build up of ions within a negative electrode of the battery.

16. The method of claim 15, wherein the charging profile is controlled to bias the ion concentration toward a desired maximum, while avoiding exceeding the maximum.

17. The method of claim 14, wherein the reduced order model based on electrochemical and thermal principles is continuously adjusted based on errors between the predicted terminal voltage and the monitored terminal voltage in real time.

18. The method of claim 14, wherein the charging profile is a pulsed charging current.

19. The method of claim 14, wherein the charging profile comprises a combination of positive, negative and zero charge currents.

20. The method of claim 14, wherein the lithium ion concentration is estimated as a function of measured current, measured terminal voltage, and temperature.

21. The method of claim 14, wherein the mathematical model produces as outputs (1) estimated surface ion concentration, (2) estimated SOC, and (3) estimated terminal voltage.

22. The method of claim 21, wherein the estimated terminal voltage is compared with a measured terminal voltage to determine a relative error between the mathematical model and the actual battery performance, and wherein the relative error is used to modify the estimated terminal voltage, the estimated SOC and the estimated ion concentration.

23. The method of claim 22, wherein the applied voltage or the applied current modified based on the relative error of terminal voltage, ion concentration and SOC are applied in a two-level cycling charging profile using charging cycles and discharging cycles.

24. The method of claim 22, wherein the applied voltage and the applied current modified based on the relative error of terminal voltage, ion concentration and SOC are applied in a three-level cycling charging profile using charging pulses, rest, and discharging pulses.

25. An apparatus for charging a rechargeable battery, the battery being of the type having an internal characteristic which is difficult or impractical to measure directly, the apparatus comprising:
  a controller configured and adapted for using a charging profile, and for estimating the internal characteristic of the battery, measuring the terminal voltage of the battery during charging, for comparing the measured terminal voltage with a predicted terminal voltage to establish an error, wherein the predicted terminal voltage is estimated based on a reduced order mathematical model, and for adjusting the charging profile by using the error in order to urge the estimated internal characteristic toward a desired level during the charging.

26. The apparatus as claimed in claim 25 wherein the battery is a lithium ion battery and the error is used to constrain the ion concentration of the lithium ion battery, which is difficult or impractical to measure directly, to be used to control the charging of the battery so as to avoid reaching undesirably high concentrations of ions during the recharging, thereby enabling rapid charging thereof without causing the battery capacity or power to fade.

27. In a battery charger controller for charging a rechargeable battery using a charging profile, the battery being of the type having an internal characteristic which is difficult or impractical to measure directly, the improvement therein comprising that the controller is adapted for estimating the internal characteristic of the battery, measuring the terminal voltage of the battery during charging, discharging, and rest, comparing the measured terminal voltage with a predicted terminal voltage to establish an error, wherein the predicted terminal voltage is estimated based on a reduced order mathematical model, and adjusting the charging profile by using the error in order to urge the estimated internal characteristic toward a desired level during the charging.

28. In a battery charger controller for charging a rechargeable lithium ion battery using a charging profile, the improvement therein comprising that the controller is adapted for:
  (a) applying a charge to the battery using a charging profile;
  (b) monitoring a terminal voltage of the battery while applying the charge using the charging profile;
  (c) using a reduced order mathematical model to estimate a desired lithium ion concentration at an electrode of the battery and to estimate a predicted terminal voltage;
  (d) using the monitored terminal voltage of the battery and the estimated terminal voltage to determine an error between the two;
  (e) applying the error to the desired lithium ion concentration to calculate a predicted lithium ion concentration; and
  (f) modifying the charge applied by the charging profile to urge the predicted lithium ion concentration toward the desired lithium ion concentration, whereby rapid charging of the battery can be obtained while avoiding or minimizing undesirable effects from excessive lithium ion concentrations.

* * * * *